United States Patent
Ntoulas et al.

(10) Patent No.: US 11,148,057 B2
(45) Date of Patent: *Oct. 19, 2021

(54) AUTOMATED GAME MODIFICATION BASED ON PLAYING STYLE

(71) Applicant: Zynga Inc., San Francisco, CA (US)

(72) Inventors: Alexandros Ntoulas, San Jose, CA (US); Jeffrey Zakrzewski, Toronto (CA); Oliver Attila Tabay, Thornhill (CA); Yuko Yamazaki, San Anselmo, CA (US); Paul Yih Yarng Chong, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,474

(22) Filed: Jan. 9, 2020

(65) Prior Publication Data

US 2020/0222810 A1 Jul. 16, 2020

Related U.S. Application Data

(63) Continuation of application No. 14/849,341, filed on Sep. 9, 2015, now Pat. No. 10,556,182.

(51) Int. Cl.
*A63F 13/00* (2014.01)
*A63F 13/67* (2014.01)
(Continued)

(52) U.S. Cl.
CPC ............ *A63F 13/67* (2014.09); *A63F 3/0423* (2013.01); *A63F 13/30* (2014.09); *A63F 13/32* (2014.09);
(Continued)

(58) Field of Classification Search
CPC ........ A63F 13/12; A63F 13/79; A63F 13/798; A63F 13/44; A63F 13/67; A63F 13/60; A63F 2300/535; A63F 2300/5546
See application file for complete search history.

(56) References Cited

U.S. PATENT DOCUMENTS

| 4,015,846 A | 4/1977 | Runte et al. |
| 4,679,789 A | 7/1987 | Okada |

(Continued)

FOREIGN PATENT DOCUMENTS

WO WO-2005061067 A1 7/2005

OTHER PUBLICATIONS

US 10,279,265 B2, 05/2019, Dhawan et al. (withdrawn)
(Continued)

*Primary Examiner* — Justin L Myhr
(74) *Attorney, Agent, or Firm* — Schwegman Lundberg & Woessner, P.A.

(57) ABSTRACT

A system, a non-transitory machine-readable storage medium storing instructions, and a computer-implemented method to modify a game based on playing style is provided. Player-specific playing style information that indicates one or more attributes of a playing style of a player is accessed. The playing style information is based on gameplay behavior of the player. Game parameters that defines at least some aspects of a game level forming part of the game is accessed. In an automated operation one or more of the game parameters are modified, thereby a difficulty of the game level for the player based on the one or more playing style attributes is modified. The modified game parameters are caused to be presented on a client device associated with the player of the game level.

19 Claims, 7 Drawing Sheets

Related U.S. Application Data

(60) Provisional application No. 62/048,362, filed on Sep. 10, 2014.

(51) Int. Cl.

| | | |
|---|---|---|
| *A63F 13/537* | (2014.01) | |
| *A63F 13/30* | (2014.01) | |
| *A63F 3/04* | (2006.01) | |
| *A63F 13/35* | (2014.01) | |
| *A63F 13/79* | (2014.01) | |
| *A63F 13/798* | (2014.01) | |
| *A63F 13/32* | (2014.01) | |
| *A63F 13/327* | (2014.01) | |
| *A63F 13/33* | (2014.01) | |
| *A63F 13/332* | (2014.01) | |
| *A63F 13/335* | (2014.01) | |
| *A63F 13/87* | (2014.01) | |
| *A63F 13/92* | (2014.01) | |
| *A63F 13/837* | (2014.01) | |
| *A63F 13/822* | (2014.01) | |

(52) U.S. Cl.
CPC .......... *A63F 13/327* (2014.09); *A63F 13/33* (2014.09); *A63F 13/332* (2014.09); *A63F 13/335* (2014.09); *A63F 13/35* (2014.09); *A63F 13/537* (2014.09); *A63F 13/79* (2014.09); *A63F 13/798* (2014.09); *A63F 13/87* (2014.09); *A63F 13/92* (2014.09); *A63F 13/822* (2014.09); *A63F 13/837* (2014.09)

(56) References Cited

U.S. PATENT DOCUMENTS

| | | | |
|---|---|---|---|
| 5,370,399 | A | 12/1994 | Liverance |
| 5,377,100 | A | 12/1994 | Pope et al. |
| 5,683,082 | A | 11/1997 | Takemoto et al. |
| 5,813,913 | A | 9/1998 | Berner et al. |
| 5,968,063 | A | 10/1999 | Chu et al. |
| 5,970,479 | A | 10/1999 | Shepherd |
| 5,971,850 | A | 10/1999 | Linerance |
| 6,106,395 | A | 8/2000 | Begis |
| 6,174,237 | B1 | 1/2001 | Stephenson |
| 6,190,370 | B1 | 2/2001 | Tsui |
| 6,213,873 | B1 | 4/2001 | Gasper et al. |
| 6,302,793 | B1 | 10/2001 | Fertitta, III et al. |
| 6,358,148 | B1 | 3/2002 | Tanaka |
| 6,375,570 | B1 | 4/2002 | Poole |
| 6,579,177 | B2 | 6/2003 | Mraovic |
| 6,641,482 | B2 | 11/2003 | Masuyama et al. |
| 6,648,760 | B1 | 11/2003 | Nicastro |
| 6,702,675 | B2 | 3/2004 | Poole et al. |
| 6,758,752 | B1 | 7/2004 | Miyagawa |
| 7,076,445 | B1 | 7/2006 | Cartwright |
| 7,094,147 | B2 | 8/2006 | Nakata et al. |
| 7,192,345 | B2 | 3/2007 | Muir et al. |
| 7,367,882 | B2 | 5/2008 | Fukutome |
| 7,425,175 | B2 | 9/2008 | Nakano et al. |
| 7,651,396 | B2 | 1/2010 | Takahashi |
| 7,717,781 | B2 | 5/2010 | Hattori et al. |
| 7,775,866 | B2 | 8/2010 | Mizuguchi et al. |
| 7,818,399 | B1 | 10/2010 | Ross, Jr. et al. |
| 7,983,895 | B2 | 7/2011 | Mcentee et al. |
| 8,016,653 | B2 | 9/2011 | Pendleton et al. |
| 8,096,879 | B2 | 1/2012 | Takeda |
| 8,161,008 | B2 | 4/2012 | Zhang et al. |
| 8,210,925 | B2 | 7/2012 | Johnson |
| 8,219,509 | B2 | 7/2012 | Ansari et al. |
| 8,303,416 | B1 | 11/2012 | Thakkar et al. |
| 8,313,370 | B2 | 11/2012 | Rogers et al. |
| 8,342,967 | B2 | 1/2013 | Thakkar et al. |
| 8,348,765 | B1 | 1/2013 | Thakkar et al. |
| 8,366,527 | B2 | 2/2013 | Takeda |
| 8,366,546 | B1 | 2/2013 | Naik et al. |
| 8,401,710 | B2 | 3/2013 | Budhraja et al. |
| 8,439,759 | B1 | 5/2013 | Mello et al. |
| 8,475,274 | B2 | 7/2013 | Jacob |
| 8,496,531 | B2 | 7/2013 | Youm |
| 8,523,660 | B2 | 9/2013 | Jacob |
| 8,529,355 | B2 | 9/2013 | Hiratake et al. |
| 8,535,149 | B2 | 9/2013 | Ziegler et al. |
| 8,550,920 | B1 | 10/2013 | Allen et al. |
| 8,585,505 | B2 | 11/2013 | Youm |
| 8,622,828 | B1 | 1/2014 | Harrington |
| 8,632,072 | B2 | 1/2014 | Loveland |
| 8,663,004 | B1 | 3/2014 | Xu |
| 8,668,581 | B2 | 3/2014 | Arnone et al. |
| 8,701,103 | B1 | 4/2014 | Hsu et al. |
| 8,721,413 | B2 | 5/2014 | Mohammed et al. |
| 8,734,243 | B2 | 5/2014 | Harrington |
| 8,764,561 | B1 | 7/2014 | Lan et al. |
| 8,944,908 | B1 | 2/2015 | Wakeford et al. |
| 8,979,651 | B1 | 3/2015 | Lan et al. |
| 8,986,116 | B1 | 3/2015 | Harrington |
| 9,033,804 | B2 | 5/2015 | Takagi et al. |
| 9,039,535 | B2 | 5/2015 | Boss et al. |
| 9,101,834 | B2 | 8/2015 | LeTourneau et al. |
| 9,104,834 | B2 | 8/2015 | Bickford et al. |
| 9,132,353 | B2 | 9/2015 | Otomo |
| 9,138,641 | B2 | 9/2015 | Rogers et al. |
| 9,153,075 | B2 | 10/2015 | Ueno et al. |
| 9,186,584 | B2 | 11/2015 | Morrison et al. |
| 9,205,338 | B1 | 12/2015 | Wakeford et al. |
| 9,218,717 | B2 | 12/2015 | Indrakumar |
| 9,266,026 | B2 | 2/2016 | Jacob |
| 9,272,208 | B1 | 3/2016 | LeTourneau et al. |
| 9,286,055 | B1 | 3/2016 | George et al. |
| 9,415,305 | B2 | 8/2016 | Cudak et al. |
| 9,486,709 | B1 | 11/2016 | Lan et al. |
| 9,533,217 | B2 | 1/2017 | Naik et al. |
| 9,533,226 | B2 | 1/2017 | Wakeford et al. |
| 9,566,518 | B2 | 2/2017 | Branson et al. |
| 9,573,063 | B2 | 2/2017 | Branson et al. |
| 9,604,145 | B2 | 3/2017 | Morrison et al. |
| 9,649,568 | B2 | 5/2017 | Wada |
| 9,675,889 | B2 | 6/2017 | Lai et al. |
| 9,682,315 | B1 | 6/2017 | Miller et al. |
| 9,724,606 | B2 | 8/2017 | Lai et al. |
| 9,737,815 | B2 | 8/2017 | Dhawan et al. |
| 9,757,650 | B2 | 9/2017 | Mehra et al. |
| 9,779,576 | B2 | 10/2017 | Shoenhair et al. |
| 9,844,723 | B2 | 12/2017 | Gregory et al. |
| 9,895,609 | B2 | 2/2018 | Miller et al. |
| 9,968,849 | B1 | 5/2018 | Lan et al. |
| 10,112,112 | B2 | 10/2018 | Lai et al. |
| 10,279,264 | B1 | 5/2019 | Aghdaie et al. |
| 10,315,114 | B2 | 6/2019 | Dhawan et al. |
| 10,363,487 | B2 | 7/2019 | Lai et al. |
| 10,376,788 | B2 | 8/2019 | Lan et al. |
| 10,384,132 | B2 | 8/2019 | Ware et al. |
| 10,391,388 | B2 | 8/2019 | Kamekawa |
| 10,409,457 | B2 | 9/2019 | Baack et al. |
| 10,413,820 | B2 | 9/2019 | Miller et al. |
| 10,456,686 | B2 | 10/2019 | Patton et al. |
| 10,556,182 | B2 | 2/2020 | Ntoulas et al. |
| 10,561,944 | B2 | 2/2020 | Ware et al. |
| 10,610,771 | B2 | 4/2020 | Kamekawa |
| 10,625,149 | B2 | 4/2020 | Kamekawa |
| 10,646,781 | B2 | 5/2020 | Lan et al. |
| 10,881,950 | B2 | 1/2021 | Kamekawa |
| 10,918,952 | B2 | 2/2021 | Ware et al. |
| 10,940,392 | B2 | 3/2021 | Dhawan et al. |
| 10,987,589 | B2 | 4/2021 | Lai et al. |
| 11,083,969 | B2 | 8/2021 | Ware et al. |
| 2002/0016954 | A1 | 2/2002 | Charisius et al. |
| 2002/0072418 | A1 | 6/2002 | Masuyama et al. |
| 2003/0040350 | A1 | 2/2003 | Nakata et al. |
| 2003/0064808 | A1 | 4/2003 | Hecht |
| 2003/0083009 | A1 | 5/2003 | Freyman et al. |
| 2003/0100369 | A1 | 5/2003 | Gatto et al. |
| 2003/0114219 | A1 | 6/2003 | McClintic |
| 2003/0153373 | A1 | 8/2003 | Squibbs |

(56) References Cited

U.S. PATENT DOCUMENTS

| | | |
|---|---|---|
| 2003/0220796 A1 | 11/2003 | Aoyama et al. |
| 2003/0224858 A1 | 12/2003 | Yoseloff et al. |
| 2004/0018878 A1 | 1/2004 | Silverman et al. |
| 2004/0019391 A1 | 1/2004 | Ferraz et al. |
| 2004/0053665 A1 | 3/2004 | Baerlocher |
| 2004/0102245 A1 | 5/2004 | Escalera et al. |
| 2004/0106452 A1 | 6/2004 | Nguyen et al. |
| 2004/0121838 A1 | 6/2004 | Hughs-Baird et al. |
| 2004/0152505 A1 | 8/2004 | Herrmann et al. |
| 2004/0220926 A1 | 11/2004 | Lamkin et al. |
| 2005/0043075 A1 | 2/2005 | Lin et al. |
| 2005/0202861 A1 | 9/2005 | Dougherty et al. |
| 2005/0266908 A1 | 12/2005 | Hattori et al. |
| 2005/0277456 A1 | 12/2005 | Mizuguchi et al. |
| 2005/0289523 A1 | 12/2005 | Spektor et al. |
| 2006/0003841 A1 | 1/2006 | Kobayashi et al. |
| 2006/0121991 A1 | 6/2006 | Borinik et al. |
| 2006/0181535 A1 | 8/2006 | Watt et al. |
| 2006/0258415 A1 | 11/2006 | Nakano et al. |
| 2006/0281535 A1 | 12/2006 | Bogan |
| 2006/0287046 A1 | 12/2006 | Walker et al. |
| 2007/0026934 A1 | 2/2007 | Herbrich et al. |
| 2007/0054717 A1 | 3/2007 | Youm et al. |
| 2007/0060038 A1 | 3/2007 | Yamashita et al. |
| 2007/0060338 A1 | 3/2007 | Kefaloukos et al. |
| 2007/0066403 A1 | 3/2007 | Conkwright |
| 2007/0156727 A1 | 7/2007 | Lim |
| 2007/0226678 A1 | 9/2007 | Li et al. |
| 2007/0265718 A1 | 11/2007 | Graepel et al. |
| 2007/0283341 A1 | 12/2007 | Wakiyama |
| 2008/0127163 A1 | 5/2008 | Fong et al. |
| 2008/0161079 A1 | 7/2008 | Wei |
| 2008/0182635 A1 | 7/2008 | Chiu |
| 2008/0227525 A1 | 9/2008 | Kelly et al. |
| 2008/0266250 A1 | 10/2008 | Jacob |
| 2008/0268943 A1 | 10/2008 | Jacob |
| 2009/0131152 A1 | 5/2009 | Busse |
| 2009/0149246 A1 | 6/2009 | Opaluch |
| 2009/0209323 A1 | 8/2009 | Ansari et al. |
| 2009/0215526 A1 | 8/2009 | Matsumoto et al. |
| 2009/0253517 A1 | 10/2009 | Bererton |
| 2010/0144424 A1 | 6/2010 | Rogers et al. |
| 2010/0144444 A1 | 6/2010 | Graham |
| 2010/0279762 A1 | 11/2010 | Sohn et al. |
| 2010/0304839 A1 | 12/2010 | Johnson |
| 2011/0086702 A1 | 4/2011 | Borst et al. |
| 2011/0165939 A1 | 7/2011 | Borst et al. |
| 2011/0281639 A1 | 11/2011 | Porat et al. |
| 2011/0312398 A1 | 12/2011 | Ziegler et al. |
| 2011/0319148 A1 | 12/2011 | Kinnebrew et al. |
| 2012/0010734 A1 | 1/2012 | Youm |
| 2012/0013072 A1 | 1/2012 | Loveland |
| 2012/0047156 A1 | 2/2012 | Jarvinen et al. |
| 2012/0088562 A1 | 4/2012 | Mohammed et al. |
| 2013/0072287 A1 | 3/2013 | Okuaki et al. |
| 2013/0083003 A1 | 4/2013 | Perez et al. |
| 2013/0130807 A1 | 5/2013 | Youm et al. |
| 2013/0151603 A1 | 6/2013 | Lobb et al. |
| 2013/0154958 A1 | 6/2013 | Clavin et al. |
| 2013/0172061 A1 | 7/2013 | Iosilevsky et al. |
| 2013/0184080 A1 | 7/2013 | Kniberg et al. |
| 2013/0205276 A1 | 8/2013 | Hirsch et al. |
| 2013/0225260 A1 | 8/2013 | Cudak et al. |
| 2013/0311951 A1 | 11/2013 | Jacob |
| 2013/0324253 A1 | 12/2013 | Hiratake et al. |
| 2014/0057722 A1 | 2/2014 | Justice et al. |
| 2014/0066176 A1 | 3/2014 | Letourneau et al. |
| 2014/0108939 A1 | 4/2014 | Mahapatra et al. |
| 2014/0274258 A1 | 9/2014 | Hartmann et al. |
| 2014/0274304 A1 | 9/2014 | Haswell |
| 2014/0295925 A1 | 10/2014 | Gladwell et al. |
| 2015/0209672 A1 | 7/2015 | Otomo |
| 2015/0246286 A1 | 9/2015 | Branson et al. |
| 2015/0352436 A1 | 12/2015 | Pieron et al. |
| 2015/0375120 A1 | 12/2015 | Lim et al. |
| 2016/0067601 A1 | 3/2016 | Mehra et al. |
| 2016/0067605 A1 | 3/2016 | Lai et al. |
| 2016/0067610 A1 | 3/2016 | Ware et al. |
| 2016/0067611 A1 | 3/2016 | Ware et al. |
| 2016/0067612 A1 | 3/2016 | Ntoulas et al. |
| 2016/0067613 A1 | 3/2016 | Ntoulas et al. |
| 2016/0067615 A1 | 3/2016 | Lai et al. |
| 2016/0082354 A1 | 3/2016 | Wakeford et al. |
| 2016/0098161 A1 | 4/2016 | Baack et al. |
| 2016/0110962 A1 | 4/2016 | Arnone et al. |
| 2016/0117890 A1 | 4/2016 | Arnone et al. |
| 2016/0256775 A1 | 9/2016 | Gustafson et al. |
| 2016/0274887 A1 | 9/2016 | Sternfeld et al. |
| 2016/0274890 A1 | 9/2016 | Sternfeld et al. |
| 2016/0381109 A1 | 12/2016 | Barnett et al. |
| 2016/0381110 A1 | 12/2016 | Barnett et al. |
| 2017/0246538 A1 | 8/2017 | Lai et al. |
| 2017/0246540 A1 | 8/2017 | Lai et al. |
| 2017/0259178 A1 | 9/2017 | Aghdaie et al. |
| 2017/0304722 A1 | 10/2017 | Mehra et al. |
| 2017/0312636 A1 | 11/2017 | Dhawan et al. |
| 2019/0224573 A1 | 7/2019 | Dhawan et al. |
| 2019/0308105 A1 | 10/2019 | Lai et al. |
| 2019/0314725 A1 | 10/2019 | Ware et al. |
| 2020/0001184 A1 | 1/2020 | Patton et al. |
| 2020/0222811 A1 | 7/2020 | Ware et al. |
| 2021/0236939 A1 | 8/2021 | Ware et al. |
| 2021/0236940 A1 | 8/2021 | Dhawan et al. |

OTHER PUBLICATIONS

"U.S. Appl. No. 13/604,552, Response filed Oct. 14, 2015 to Final Office Action dated Jul. 27, 2015", 11 pgs.

"U.S. Appl. No. 13/604,552, Examiner Interview Summary dated Oct. 16, 2015", 3 pgs.

"U.S. Appl. No. 13/604,552, Notice of Allowance dated Nov. 20, 2015", 5 pgs.

"U.S. Appl. No. 14/480,983, First Action Interview—Pre-Interview Communication dated Oct. 31, 2016", 5 pgs.

"U.S. Appl. No. 14/854,617, First Action Interview—Pre-Interview Communication dated Dec. 7, 2016", 4 pgs.

"U.S. Appl. No. 14/480,983, Response filed Jan. 18, 2017 to First Action Interview—Pre-Interview Communication dated Oct. 31, 2016", 11 pgs.

"U.S. Appl. No. 14/480,983, Examiner Interview Summary dated Jan. 23, 2017", 3 pgs.

"U.S. Appl. No. 14/876,208, Non Final Office Action dated Feb. 27, 2017", 7 pgs.

"U.S. Appl. No. 14/480,983, Notice of Allowance dated Mar. 29, 2017", 9 pgs.

"U.S. Appl. No. 14/854,617, Non Final Office Action dated May 15, 2017", 16 pgs.

"U.S. Appl. No. 15/594,016, Preliminary Amendment filed May 15, 2017", 9 pgs.

"U.S. Appl. No. 14/876,208, Response filed May 26, 2017 to Non Final Office Action dated Feb. 27, 2017", 9 pgs.

"U.S. Appl. No. 14/876,208, Final Office Action dated Jun. 29, 2017", 7 pgs.

"U.S. Appl. No. 15/594,016, First Action Interview—Pre-Interview Communication dated Aug. 8, 2017", 4 pgs.

"U.S. Appl. No. 14/876,208, Response filed Oct. 30, 2017 to Final Office Action dated Jun. 29, 2017", 12 pgs.

"U.S. Appl. No. 14/876,208, Non Final Office Action dated Dec. 20, 2017", 9 pgs.

"U.S. Appl. No. 15/594,016, Non Final Office Action dated Feb. 6, 2018", 6 pgs.

"U.S. Appl. No. 15/594,016, Response filed Mar. 6, 2018 to Non Final Office Action dated Feb. 6, 2018", 11 pgs.

"U.S. Appl. No. 15/594,016, Notice of Allowance dated Jun. 15, 2018", 8 pgs.

"U.S. Appl. No. 14/876,208, Final Office Action dated Jun. 29, 2018", 13 pgs.

"U.S. Appl. No. 14/876,208, Examiner Interview Summary dated Aug. 16, 2018", 3 pgs.

(56) References Cited

OTHER PUBLICATIONS

"U.S. Appl. No. 14/876,208, Response filed Oct. 29, 2018 to Final Office Action dated Jun. 29, 2018", 11 pgs.
"U.S. Appl. No. 14/876,208, Non Final Office Action dated Nov. 29, 2018", 20 pgs.
"U.S. Appl. No. 14/876,208, Response filed Feb. 27, 2019 to Non Final Office Action dated Nov. 29, 2018", 12 pgs.
"U.S. Appl. No. 14/876,208, Notice of Allowance dated Apr. 11, 2019", 13 pgs.
"U.S. Appl. No. 14/849,291, Response filed Sep. 23, 2019 to Non-Final Office Action dated Mar. 22, 2019", 12 pgs.
"U.S. Appl. No. 14/849,341, Corrected Notice of Allowability dated Jan. 14, 2020", 2 pgs.
"U.S. Appl. No. 16/371,967, Non Final Office Action dated Apr. 9, 2020", 10 pgs.
"U.S. Appl. No. 16/371,967, Response filed Jul. 9, 2020 to Non Final Office Action dated Apr. 9, 2020", 16 pgs.
"U.S. Appl. No. 16/371,967, Ex Parte Quayle Action mailed Jul. 29, 2020", 4 pgs.
"U.S. Appl. No. 16/371,967, Response filed Sep. 29, 2020 to Ex Parte Quayle Action mailed Jul. 29, 2020", 13 pgs.
"U.S. Appl. No. 16/742,609, Non Final Office Action dated Oct. 7, 2020", 9 pgs.
"U.S. Appl. No. 16/427,925, Response filed Oct. 8, 2020 to Non Final Office Action dated Jun. 8, 2020", 14 pgs.
"U.S. Appl. No. 16/454,529, Notice of Allowance dated Oct. 9, 2020", 15 pgs.
"U.S. Appl. No. 16/371,967, Notice of Allowance dated Nov. 6, 2020", 5 pgs.
"U.S. Appl. No. 13/604,552, Final Office Action dated Apr. 8, 2015", 8 pgs.
"U.S. Appl. No. 13/604,552, Non Final Office Action dated Jul. 27, 2015", 8 pgs.
"U.S. Appl. No. 13/604,552, Non Final Office Action dated Oct. 31, 2014", 8 pgs.
"U.S. Appl. No. 13/604,552, Response filed Jan. 30, 2015 to Non-Final Office Action dated Oct. 31, 2014", 10 pgs.
"U.S. Appl. No. 13/604,552, Response filed Jul. 1, 2015 to Final Office Action dated Apr. 8, 2015", 10 pgs.
"U.S. Appl. No. 14/018,998, Non Final Office Action dated Oct. 31, 2014", 8 pgs.
"U.S. Appl. No. 14/018,998, Notice of Allowance dated Apr. 8, 2015", 8 pgs.
"U.S. Appl. No. 14/018,998, Response filed Jan. 30, 2015 to Non-Final Office Action dated Oct. 31, 2014", 10 pgs.
"U.S. Appl. No. 14/546,865, Amendment Under 37 C.F.R. 1.312 filed Mar. 1, 2017", 9 pgs.
"U.S. Appl. No. 14/546,865, Corrected Notice of Allowance dated Mar. 3, 2017", 4 pgs.
"U.S. Appl. No. 14/546,865, Examiner Interview Summary dated Dec. 21, 2016", 3 pgs.
"U.S. Appl. No. 14/546,865, Non Final Office Action dated Sep. 15, 2016", 8 pgs.
"U.S. Appl. No. 14/546,865, Notice of Allowance dated Feb. 7, 2017", 5 pgs.
"U.S. Appl. No. 14/546,865, PTO Response to Rule 312 Communication dated Mar. 10, 2017", 2 pgs.
"U.S. Appl. No. 14/546,865, Response filed Dec. 14, 2016 to Non Final Office Action dated Sep. 15, 2016", 12 pgs.
"U.S. Appl. No. 14/569,534, Amendment under 37 C.F.R. § 1.312 filed Jun. 26, 2019", 3 pgs.
"U.S. Appl. No. 14/569,534, Examiner Interview Summary dated Dec. 13, 2018", 3 pgs.
"U.S. Appl. No. 14/569,534, Final Office Action dated Apr. 20, 2018", 9 pgs.
"U.S. Appl. No. 14/569,534, Non Final Office Action dated Jun. 23, 2017", 9 pgs.
"U.S. Appl. No. 14/569,534, Non Final Office Action dated Aug. 28, 2018", 23 pgs.
"U.S. Appl. No. 14/569,534, Notice of Allowance dated Mar. 27, 2019", 14 pgs.
"U.S. Appl. No. 14/569,534, Response filed Jul. 20, 2018 to Final Office Action dated Apr. 20, 2018", 13 pgs.
"U.S. Appl. No. 14/569,534, Response filed Nov. 28, 2018 to Non Final Office Action dated Nov. 28, 2018", 16 pgs.
"U.S. Appl. No. 14/569,534, Response filed Dec. 22, 2017 to Non Final Office Action dated Jun. 23, 2017", 14 pgs.
"U.S. Appl. No. 14/572,203, Examiner Interview Summary dated Mar. 10, 2017", 4 pgs.
"U.S. Appl. No. 14/572,203, Examiner Interview Summary dated Apr. 7, 2016", 19 pgs.
"U.S. Appl. No. 14/572,203, Examiner Interview Summary dated Jun. 29, 2016", 3 pgs.
"U.S. Appl. No. 14/572,203, Final Office Action dated Sep. 13, 2016", 13 pgs.
"U.S. Appl. No. 14/572,203, First Action Interview dated Feb. 26, 2016", 15 pgs.
"U.S. Appl. No. 14/572,203, First Action Interview dated Apr. 7, 2016", 20 pgs.
"U.S. Appl. No. 14/572,203, Non Final Office Action dated Dec. 30, 2016", 12 pgs.
"U.S. Appl. No. 14/572,203, Notice of Allowance dated Apr. 21, 2017", 12 pgs.
"U.S. Appl. No. 14/572,203, Response filed Mar. 3, 2017 to Non Final Office Action dated Dec. 30, 2016", 10 pgs.
"U.S. Appl. No. 14/572,203, Response filed Dec. 5, 2016 to Final Office Action dated Sep. 13, 2016", 11 pgs.
"U.S. Appl. No. 14/572,203, Response filed Jun. 7, 2016 to First Action Interview dated Apr. 7, 2016", 16 pgs.
"U.S. Appl. No. 14/601,807, First Action Interview—Office Action Summary dated Mar. 6, 2017", 3 pgs.
"U.S. Appl. No. 14/601,807, First Action Interview—Pre-Interview Communication dated Nov. 1, 2016", 4 pgs.
"U.S. Appl. No. 14/601,807, Notice of Allowance dated Jun. 7, 2017", 5 pgs.
"U.S. Appl. No. 14/601,807, Response filed Apr. 14, 2017 to Non Final Office Action dated Mar. 6, 2017", 9 pgs.
"U.S. Appl. No. 14/601,807, Response filed Dec. 15, 2016 to First Action Interview—Pre-Interview Communication dated Nov. 1, 2016", 9 pgs.
"U.S. Appl. No. 14/662,704, First Action Interview-Pre-Interview Communication dated Aug. 25, 2016", 5 pgs.
"U.S. Appl. No. 14/662,704, Non Final Office Action dated Jan. 27, 2017", 15 pgs.
"U.S. Appl. No. 14/849,291, Examiner Interview Summary dated Nov. 20, 2017", 3 pgs.
"U.S. Appl. No. 14/849,291, Final Office Action dated Oct. 6, 2017", 12 pgs.
"U.S. Appl. No. 14/849,291, Final Office Action dated Oct. 22, 2018", 15 pgs.
"U.S. Appl. No. 14/849,291, Non Final Office Action dated Feb. 12, 2016", 9 pgs.
"U.S. Appl. No. 14/849,291, Non Final Office Action dated Mar. 22, 2019", 15 pgs.
"U.S. Appl. No. 14/849,291, Non Final Office Action dated Apr. 20, 2018", 14 pgs.
"U.S. Appl. No. 14/849,291, Non Final Office Action dated Dec. 30, 2016", 9 pgs.
"U.S. Appl. No. 14/849,291, Notice of Allowance dated Oct. 9, 2019", 14 pgs.
"U.S. Appl. No. 14/849,291, Response filed Jan. 22, 2019 to Final Office Action dated Oct. 22, 2018", 12 pgs.
"U.S. Appl. No. 14/849,291, Response filed Mar. 6, 2018 to Final Office Action dated Oct. 6, 2017", 11 pgs.
"U.S. Appl. No. 14/849,291, Response filed May 10, 2016 to Non Final Office Action dated Feb. 12, 2016", 14 pgs.
"U.S. Appl. No. 14/849,291, Response filed Sep. 20, 2018 to Non Final Office Actio dated Apr. 20, 2018", 11 pgs.
"U.S. Appl. No. 14/849,291, Response filed May 30, 2017 to Non Final Office Action dated Dec. 30, 2016", 11 pgs.
"U.S. Appl. No. 14/849,341, Final Office Action dated Mar. 7, 2018", 15 pgs.

(56) References Cited

OTHER PUBLICATIONS

"U.S. Appl. No. 14/849,341, Final Office Action dated Apr. 19, 2019", 12 pgs.
"U.S. Appl. No. 14/849,341, Non Final Office Action dated Jul. 6, 2017", 14 pgs.
"U.S. Appl. No. 14/849,341, Non Final Office Action dated Sep. 11, 2018", 12 pgs.
"U.S. Appl. No. 14/849,341, Notice of Allowance dated Oct. 2, 2019", 9 pgs.
"U.S. Appl. No. 14/849,341, Response filed Dec. 6, 2017 to Non Final Office Action dated Jul. 6, 2017", 11 pgs.
"U.S. Appl. No. 14/849,341, Response Filed Aug. 7, 2018 to Final Office Action dated Mar. 7, 2018", 12 pgs.
"U.S. Appl. No. 14/849,341, Response filed Sep. 19, 2019 to Final Office Action dated Apr. 19, 2019", 10 pgs.
"U.S. Appl. No. 14/849,354 Notice of Non-Compliant Amendment dated Apr. 25, 2018", 3 Pgs.
"U.S. Appl. No. 14/849,354 Response Filed Jun. 25, 2018 to Notice of Non-Compliant Amendment dated Apr. 25, 2018", 8 pgs.
"U.S. Appl. No. 14/849,354, Final Office Action dated Apr. 29, 2019", 10 pgs.
"U.S. Appl. No. 14/849,354, Non Final Office Action dated Sep. 21, 2018", 10 pgs.
"U.S. Appl. No. 14/849,354, Notice of Allowance dated Jun. 12, 2019", 7 pgs.
"U.S. Appl. No. 14/849,354, Response filed Feb. 20, 2018 to Restriction Requirement dated Oct. 19, 2017", 8 pgs.
"U.S. Appl. No. 14/849,354, Response filed Feb. 21, 2019 to Non Final Office Action dated Sep. 21, 2018", 11 pgs.
"U.S. Appl. No. 14/849,354, Response filed May 14, 2019 to Final Office Action dated Apr. 29, 2019", 12 pgs.
"U.S. Appl. No. 14/849,354, Restriction Requirement dated Oct. 19, 2017", 6 pgs.
"U.S. Appl. No. 15/593,807, Examiner Interview Summary dated Jul. 3, 2018", 2 pgs.
"U.S. Appl. No. 15/593,807, Final Office Action dated Dec. 11, 2018", 6 pgs.
"U.S. Appl. No. 15/593,807, First Action Interview—Office Action Summary dated Jul. 10, 2018", 3 pgs.
"U.S. Appl. No. 15/593,807, First Action Interview—Pre-Interview Communication dated Mar. 16, 2018", 4 pgs.
"U.S. Appl. No. 15/593,807, Notice of Allowance dated Feb. 26, 2019", 5 pgs.
"U.S. Appl. No. 15/593,807, Response filed Feb. 8, 2019 to Final Office Action dated Dec. 11, 2018", 11 pgs.
"U.S. Appl. No. 15/593,807, Response filed Sep. 10, 2018 to First Action Interview dated Jul. 10, 2018", 11 pgs.
"U.S. Appl. No. 15/646,953, Final Office Action dated Nov. 19, 2018", 22 pgs.
"U.S. Appl. No. 15/646,953, Non Final Office Action dated Jan. 26, 2018", 13 pgs.
"U.S. Appl. No. 15/646,953, Preliminary Amendment filed Jul. 12, 2017", 8 pgs.
"U.S. Appl. No. 15/646,953, Response filed Jun. 26, 2018 to Non Final Office Action dated Jan. 26, 2018", 14 pgs.
"U.S. Appl. No. 15/652,800, Corrected Notice of Allowability dated Mar. 28, 2019", 2 pgs.
"U.S. Appl. No. 15/652,800, Corrected Notice of Allowability dated May 13, 2019", 3 pgs.
"U.S. Appl. No. 15/652,800, Examiner Interview Summary dated Jul. 3, 2018", 2 pgs.
"U.S. Appl. No. 15/652,800, First Action Interview—Office Action Summary dated Jul. 13, 2018", 3 pgs.
"U.S. Appl. No. 15/652,800, First Action Interview—Pre-Interview Communication dated Apr. 10, 2018", 4 pgs.
"U.S. Appl. No. 15/652,800, Notice of Allowance dated Dec. 28, 2018", 6 pgs.
"U.S. Appl. No. 15/652,800, Response filed Nov. 13, 2018 to First Action Interview—Office Action Summary dated Jul. 13, 2018", 14 pgs.

"U.S. Appl. No. 15/593,807, Preliminary Amendment filed May 15, 2017", 8 pgs.
Walt, Scacchi, et al., "Free and Open Source Development Practices in the Game Community", IEEE 2004, [Online] retrieved from the internet:<http://ieeexplore.ieee.org/stamp/stamp.jsp?tp=&arnumber=1259221>, 59-66.
"U.S. Appl. No. 16/427,925, Non Final Office Action dated Jun. 8, 2020", 9 pgs.
"U.S. Appl. No. 16/454,529, Preliminary Amendment filed Jun. 22, 2020", 8 pgs.
"U.S. Appl. No. 16/427,925, Notice of Allowance dated Dec. 23, 2020", 5 pages.
"U.S. Appl. No. 16/742,609, Response filed Mar. 8, 2021 to Non Final Office Action dated Oct. 7, 2020", 9 pages.
"U.S. Appl. No. 16/569,255, Restriction Requirement dated Mar. 26, 2021", 6 pages.
U.S. Appl. No. 17/217,112, filed Mar. 30, 2021, Systems and Methods for Determining Game Level Attributes Based on Player Skill Level Prior to Game Play in the Level.
U.S. Appl. No. 17/175,291, filed Feb. 12, 2021, Experimentation and Optimization Service.
U.S. Appl. No. 17/148,885, filed Jan. 14, 2021, Determining Harness Quotients for Level Definition Files Based on Player Skill Level.
U.S. Appl. No. 14/546,865, U.S. Pat. No. 9,675,889, filed Nov. 18, 2014, Systems and Methods for Determining Game Level Attributes Based on Player Skill Level Prior to Game Play in the Level.
U.S. Appl. No. 15/593,807, U.S. Pat. No. 10/363,487, filed May 12, 2017, Systems and Methods for Determining Game Level Attributes Based on Player Skill Level Prior to Game Play in the Level.
U.S. Appl. No. 16/427,925, filed May 31, 2019, Systems and Methods for Determining Game Level Attribuies Based on Player Skill Level Prior to Game Play in the Level.
U.S. Appl. No. 14/569,534, U.S. Pat. No. 10,384,132, filed Dec. 12, 2014, Determining Hardness Quotients for Level Definition Files Based on Player Skill Level.
U.S. Appl. No. 16/454,529, filed Jun. 27, 2019, Determining Hardness Quotients for Level Definition Files Based on Player Skill Level.
U.S. Appl. No. 14/601,807, U.S. Pat. No. 9,737,815, filed Jan. 21, 2015, Experimentation and Optimization Service.
U.S. Appl. No. 16/371,967, filed Apr. 1, 2019, Experimentation and Optimization Service.
U.S. Appl. No. 15/652,800, U.S. Pat. No. 10,315,114, filed Jul. 18, 2017, Experimentation and Optimization Service.
U.S. Appl. No. 14/662,704, filed Mar. 19, 2015, Modifying Client Device Game Applications.
U.S. Appl. No. 14/849,291, filed Sep. 9, 2015, Adjusting Object Adaptive Modification or Game Level Difficulty and Physical Gestures Through Level Definition Files.
U.S. Appl. No. 14/849,341, filed Sep. 9, 2015, Automated Game Modification Based on Playing Style.
U.S. Appl. No. 14/572,203, U.S. Pat. No. 9,757,650, filed Dec. 16, 2014, Sequencing and Locations of Selected Virtual Objects to Trigger Targeted Game Actions.
U.S. Appl. No. 15/646,953, filed Jul. 11, 2017, Sequencing and Locations of Selected Virtual Objects to Trigger Targeted Game Actions.
U.S. Appl. No. 14/849,354, U.S. Pat. No. 10,456,686, filed Sep. 9, 2015, Methods and Systems for Adaptive Tuning of Game Events.
U.S. Appl. No. 16/569,255, filed Sep. 12, 2019, Methods and Systems for Adaptive Tuning of Game Events.
U.S. Appl. No. 16/742,609, filed Jan. 14, 2020, Adjusting Object Adaptive Modification or Game Level Difficulty and Physical Gestures Through Level Definition Files.
"U.S. Appl. No. 16/742,609, Notice of Allowance dated Apr. 5, 2021", 14 pgs.
"U.S. Appl. No. 17/148,885, Preliminary Amendment filed May 24, 2021", 9 pages.
"U.S. Appl. No. 16/569,255, Response filed May 26, 2021 to Restriction Requirement dated Mar. 26, 2021", 10 pgs.
U.S. Appl. No. 17/369,297, filed Jul. 7, 2021, Dynamic Game Difficulty Modification Via Swipe Input Parater Change.

(56) References Cited

OTHER PUBLICATIONS

"U.S. Appl. No. 17/067,550, First Action Interview—Pre-Interview Communication dated Jun. 15, 2021", 4 pages.
"U.S. Appl. No. 17/217,112, Preliminary Amendment filed Jun. 28, 2021", 10 pages.

AUTOMATED GAME MODIFICATION BASED ON PLAYING STYLE

CROSS-REFERENCE TO RELATED APPLICATIONS

This application is a continuation of U.S. patent application Ser. No. 14/849,341, filed on Sep. 9, 2015, now issued as U.S. Pat. No. 10,556,182, which claims the benefit of priority to U.S. Provisional Application Ser. No. 62/048,362, filed on Sep. 10, 2014, the disclosures of each of which are incorporated herein by reference in their entireties.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, etc. A player character in an online poker game may be able to play at specific tables, place bets of virtual currency for certain amounts, play or fold certain hands, play in an online poker tournament, etc.

A technical difficulty often experienced with automated machine-implemented gaming systems is to provide in automated fashion for more or less accurate matching of a player's playing style (e.g., the player's playing style is based on their personality, strength, weakness, and the like) and game difficulty level. If the game is too difficult or too easy, the player often loses interest in the particular game. Linear progression through progressively more difficult game levels or allowing for player-selection of game levels based on difficulty level often fail to provide for gaming experience within a suitable range of subjectively experienced difficulty levels. This is because different players sometimes have different strengths and weaknesses. Two players who are rated superficially at the same skill or experience level in a particular game can thus often have strongly. divergent experiences of the difficulty of completing a particular game level or challenge.

DESCRIPTION OF EXAMPLE EMBODIMENTS

Figure 1:
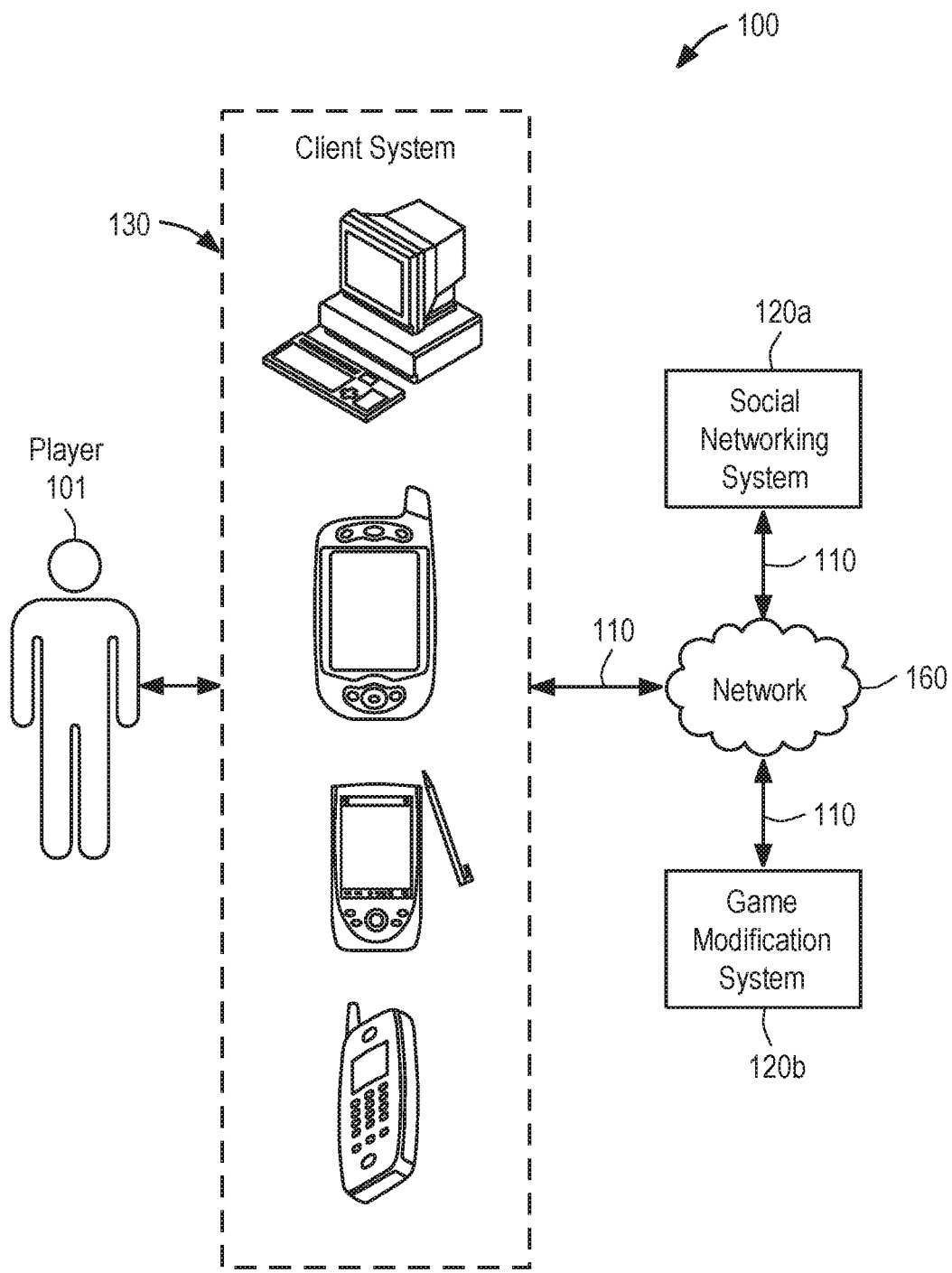
FIG. 1 is a schematic diagram showing an example of a system, according to some example embodiments.

One aspect of the present disclosure provides a technical solution to the technical problem of determining, in automated fashion, a player's playing style for use in game modification. A game modification system provides, in some embodiments, the technical benefit of modifying in-level gameplay based on a player-specific gameplay personality, gameplay style, or strategy prefer. As a result the game modification system provides the benefit of adjusting the current game to make it "just hard enough" for the any specific player and thereby keeping the player engaged with the game. Additionally, other technical effects will be apparent from this disclosure as well.

Current game optimizing techniques lack the personalization and continual learning required to tailor the difficulty level for a specific player as the game progresses in a level or between levels. Each player has different behaviors in the way they respond to game tactics and therefore the rigid tiered difficulty level of beginner, intermediate, and advance do not fully optimize the difficulty level for a specific player based on their playing style while playing the game. For example, when comparing two players who are advanced, one player may respond much better to sudden obstacles in the way, while the other player may perform much better at optimizing the path to winning. Therefore, a game modification system can adjust the difficulty level of the game based on the specific player's playing style. Further, the currently available tiered structure of the difficulty level does not allow for the game to dynamically tune and adjust the difficulty in-level (changing the difficulty in the same level based on how well the player is currently playing). For example, the level can start out as intermediate but mid way through the level, the game modification system adjusts the difficulty level to become more difficulty in association with how successful the player has been at completing certain types of obstacles.

In some embodiments, a method may include accessing player-specific playing style information that indicates one or more attributes of a playing style of a player of a computer-implemented game; accessing game parameters that defines at least sonic aspects of a game level forming part of the game; in an automated operation that is performed using one or more at least one hardware processor of a machine and that is based at least in part on the playing style information for the player, modifying one or more of the game parameters, thereby to modify a difficulty of the game level for the player based on the one or more playing style attributes; and/or causing presentation on a client device associated with the player of the game level in accordance with the one or more modified game parameters.

In some embodiments, the playing style information may be based on gameplay behavior of the player.

In some embodiments, such a method may further include determining the one or more playing style attributes of the player by performing automated analysis of the gameplay behavior of the player. The gameplay behavior can be analyzed based on a current game or a past games. The playing style attributes can include, but not limited to, gameplay the player is good at, gameplay the player is bad at, along with weaknesses, strengths, behavior trait, behavior pattern, and personal playing style of the player profile.

In some embodiments, the determining of the one or more playing style attributes of the player may include assigning, based on the gameplay behavior a respective weight to each of a predefined group of behavior patterns, thereby to generate a weighted set of behavior patterns.

In some embodiments, the gameplay behavior may include historical gameplay behavior pertaining to gameplay actions performed by the player prior to playing the game level.

In some embodiments, the gameplay behavior may include current gameplay behavior represented by gameplay actions performed by the player during playing of the game level.

In some embodiments, the modifying of the one or more game parameters is performed live, during playing of the game level, so that portions of the game level played subsequent to the modifying is presented to the player at the modified difficulty.

In some embodiments, such a method may further include monitoring current performance by the player in the game; comparing the current performance of the player with a predefined performance target; and/or in response to determining a discrepancy between the current performance and the performance target, performing the modifying of the one or more game parameters.

In some embodiments, the performance target may include a target value for a game score corresponding to current progress of the player in the game.

In some embodiments, the target value may include a target range for the game score.

In some embodiments, the discrepancy between the performance target and the current performance may include that the game score of the player falls outside the target range.

In some embodiments, the current performance may include a failure count indicating a number of times the player has failed to complete the game level or a part of the game level.

In some embodiments, such a method may further include accessing historical performance data in the game level for a population of players of the game and/or determining the performance target based on the historical performance data.

In some embodiments, adjusting the game may include changing the board structure and board geometry of the game.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 1120b and no social networking systems 120a. As another example and not by way of limitation, system 100 may include a system that comprises both social networking system 120a and game networking system 120b. Moreover, although FIG. 1 illustrates a particular arrangement of player 101, social network system 120a, game networking system 120b, client system 130, and network 160, this disclosure contemplates any suitable arrangement of player 101, social network system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120a, game networking system 120b, client system 130, and network 160, this disclosure contemplates any suitable connections between player 101, social network system 120a, game networking system 120b, client system 130, and network 160. As an example and not by way of limitation, in particular embodiments, client system 130 may have a direct connection to social network system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
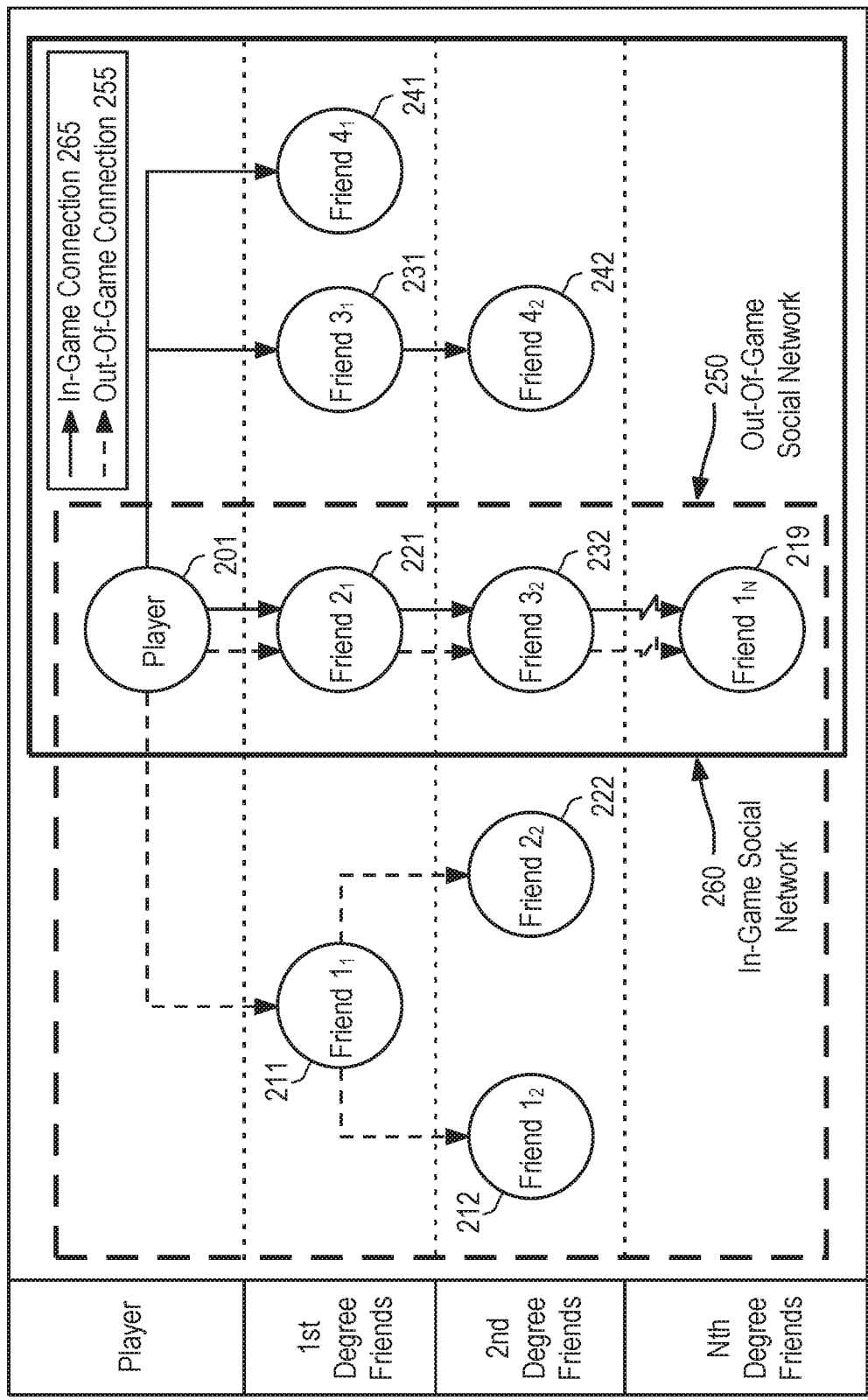
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system, FIG. 2 depicts an example of in-game social network 260 and out-of-game social network 250. In this example, Player 201 has out-of-game connections 255 to a. plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Customization and Refinement

The game modification system employs dynamic tuning in order to adapt and learn the player's playing style and adjust game play accordingly. The game modification system tunes and adjusts the mechanic of game play and game flow to further refine game customization for a player on an in-level and end-level basis. The result is a modification based on the playing style by tailoring the game to make the game feel personalized to the player by making the game "just hard enough" for the player. The dynamic tuning is utilized differently in different games. The application of the dynamic tuning in a game depends on the game play itself. In an example embodiment, the tuning is used for in-level refinement using player-based data to modify tile board geometry and structure. That is, the game uses a variety of types of player-based data to modify the tile board geometry and the strategic tile board structure to make the game "just hard enough" for the player. Through the player-based data, the game knows how a player has typically played in prior levels and the current level so far. Using a neural network based artificial intelligence learning method, the game adjusts the difficulty level to match the level of the game to the player's playing style, thereby making the game "just hard enough" for the player.

Figure 3:
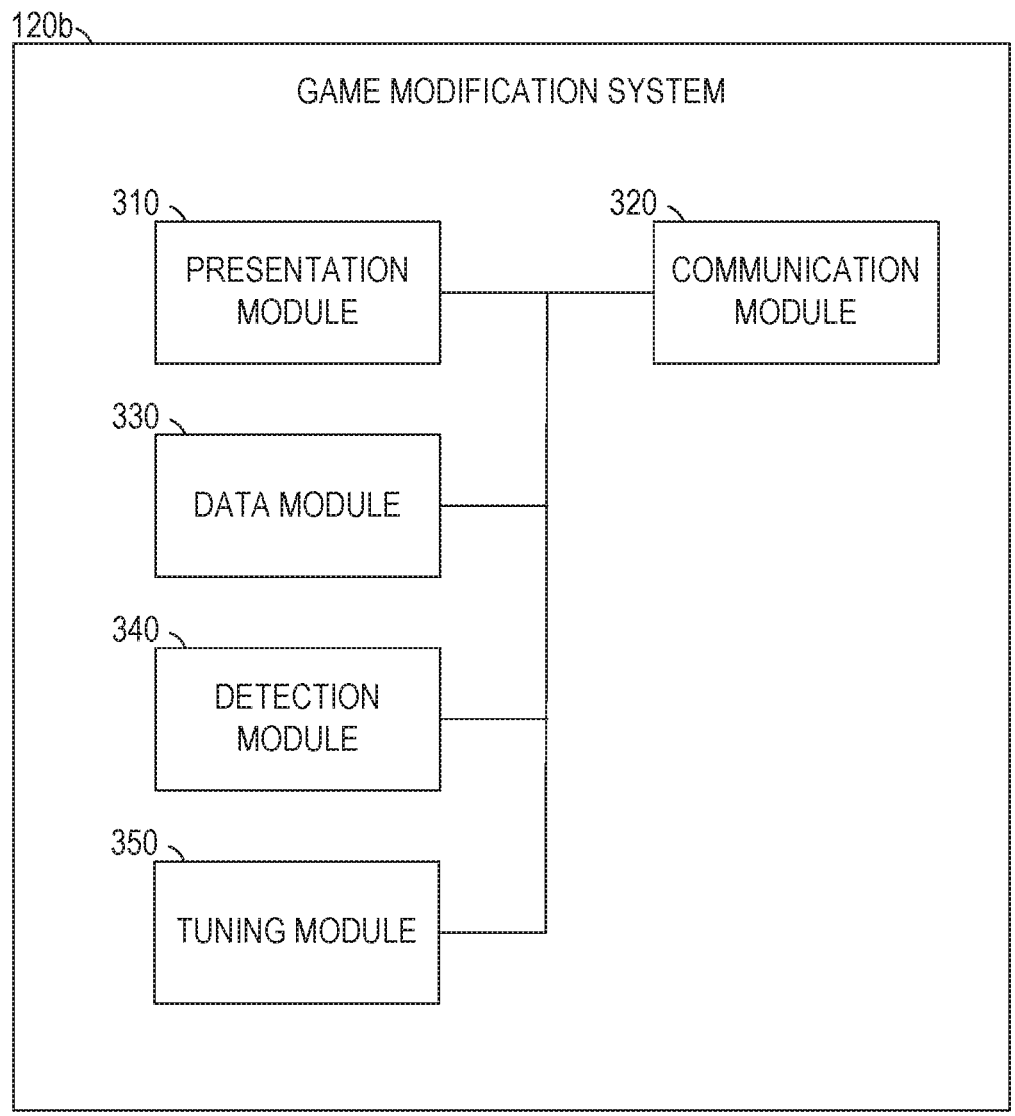
FIG. 3 is a block diagram illustrating components of a game modification system, according to some example embodiments.

FIG. 3 is a block diagram of an example embodiment of a game modification system 120b that provides functionality to refine game customization for a player on an in-level game basis. In an example embodiment, the game modification system 120b includes a presentation module 310, a communication module 320, a data module 330, a detection module 340, and a tuning module 350. All, or some, of the modules 310-350 of FIG. 3 communicate with each other, for example, via a network coupling, shared memory, and the like. It will be appreciated that each module can be implemented as a single module, combined into other modules, or further subdivided into multiple modules. The data module 330 stores, accesses, and receives historical player-based data and assigns a weight to the data according to how the specific player plays. The detection module 340 determines the current difficulty level of the game for the player based on the player score. The tuning module 350 adjusts the difficulty level of the game based on the determined difficulty of the game in order to match the difficulty of the game to the player's playing style (e.g. make the game "just hard enough" for the player). In an example embodiment, the tuning module 350 modifies the game by determine the playing style for the player. In an example, the tuning module 350 adjusts by modifying tile board geometry. In another example, the tuning module 350 adjusts by modifying the strategic tile board structure. The presentation module 310 presents in real-time at the gaining interface the types of adjustment to the game play determined by the tuning module 350. Other modules not pertinent to example embodiments can also be included, but are not shown.

In various example embodiments, the presentation module 10 provides various presentations and user interface functionality operable to interactively present (or cause presentation) and receive information from the player. For instance, the presentation module 310 can cause presentation of a game adjustment determined by the tuning module 350 on a payer game interface of a player device. In an example embodiment, the presentation include the modified tile board geometry or the modified strategic tile board structure to adjust the difficulty of the game play as customized for the player. In various implementations, the presentation module 310 presents or causes presentation of information (e.g., visually displaying information on a screen, acoustic output, haptic feedback). Interactively presenting information is intended to include the exchange of information between a particular device and the payer. The player may provide input to interact with the game interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 310 provides many other game interfaces to facilitate functionality described herein. Further, it will be appreciated that "presenting" as used herein is intended to include communicating information or instructions to a particular device that is operable to perform presentations based on the communicated information or instructions.

In various example embodiments, the communication module 320 provides various communications functionality and web services from the client device to the game modification system 120b along with communication between the modules. For example, the communication module 320 provides network communication such as communicating with the networked system 160, the client system 130, and the social networking system 120a. In various example embodiments, the network communication can operate over wired or wireless modalities. Web services are intended to include retrieving information from the client system 130, and the social networking system 120a. In some embodiments, the communication module 320 receives information from the client devices within the client system 130 such as player-based game data resulting from the game play that the player engages in (e.g., all the player inputs while playing the game and the results of the game)

In various example embodiments, the data module 330 provides functionality to access or receive player historical data and current data, each of which include, for example, one or more tuning adjustment metrics from the tuning module 350, and other data. The data is stored in a database that is then accessed by or transmitted to the data module 330. In an example, the historical and current data are accessed by the detection module 340. The data is updated in real-time based on the current game play of the user, which is fed back into the system to the database, where the data is received or accessed by the tuning module. Current data as the player plays the game is detected by the data module 330 from the client device in which the player is using. In other examples, the data module 330 transmits the historical and current data to the detection module 340. The historical data of user player-based data include what and how the player plays. In one example embodiment, historical data include the characteristic of the words that the player plays (e.g., the average length of words and types of words). For example, a player usually likes to play on words with an average length of four to five letters. In another example, a player normally opts for types of words having vowels as the majority of the letters. The way a player usually plays is used by the detection module 340 to determine the pattern of player behavior.

In further embodiments, the data module 330 uses the various types of player-based data to determine the pattern of player behavior and propensity of a player to choose one path over another available in a game. The pattern and behavior that contribute to the player's playing style is based on the interaction between the player and the game at the current difficulty level in which the player is playing The data module 330 analyzes the player-based data to determine player behavior, including: the average word length selected by the player in a game move, the types of words the player usually selects (i.e. common prefixes used by the player, common suffixes used by the player, whether or not the player typically selects words ending in "er" or "ing"), how often the player uses bonus tiles, how many tiles the player usually plays until the player meets a given level's objective, the number of game moves the player usually uses, how easily the player identifies certain types of phrases that are included in a bonus meter, along with other patterns in game play objectives. In other words, the data module 330 utilizes the player-based data to determine the playing style of the player. Each type of player-based behavior and propensity can be a variable input in the game modification system 120b for the tuning module 350 to adjust for the specific player, and each respective input is assigned a given weight (or priority).

In yet further embodiments, the data module 330 assigns a weight to each of the determined player-based behavior input. The weight assigned is based on a neural network approach as applied to intelligent learning. A large amount of player-based behavior input parameters is fed into the game modification system 120b, a weight is then determined for each of the input parameters. As the player plays a first level with the current weighted parameter that influences level difficulty, then the system utilizes the current first level game play in order to update and change the assigned weight in order to change and fine tune the difficulty of the level to make the game "just hard enough" for the player. A game would be considered "just hard enough" for the player when the player successfully completes the level in a certain amount of time or within a certain number of tries, successfully completing each obstacle and hazard within a threshold setting, along with further examples described herein. The more the player plays a game, the game modification system 120b can gather additional data for more advanced application of neural network approach to intelligently learn how to fine tune the difficulty level for the player via adjusting the weight of each parameter input.

In further embodiments, the data module 330 also analyzes the population average for each difficulty level in the game. The population average can include the mean, medium or mode of the population. Population can include the whole population that plays a game, a range of age groups that plays the game, players within a certain location, players with the same playing style, players within the same level, and the like. For each difficulty level, the data module 330 calculates the distribution average for each behavior based data parameter that is also gathered for each individual player as described above. In an example, the data module 330 can calculate that for a certain specific level, the average player would beat the game using 85 tiles, while a player whose strength exceeds the game difficulty (e.g., the level is too easy for the player) would beat the game using fewer tiles, while a less skilled player (e.g., a player whose strength is far below the game difficulty) would beat the game using more tiles. The standard deviation and standard error is also calculated in the analysis for certainty in the prediction executed by the tuning module 350.

In various example embodiments, the detection module 340 is configured to detect player-based actions of a player during a game play event of a multiplayer game. Player-based actions may be affected via a client device used by a player uniquely associated with the player character or player account. In other words, the game modification system 120b may receive data from the client device operated by the player. The data may pertain to the actions of the player choices in a game play event. The detection module 340 continuously calculates and updates in real-time the data module 330 regarding game-related data that describes the game performance of the player within the level.

In further example embodiments, the detection module 340 can directly access the historical and current data or receives the historical data from the data module 330. In an example embodiment, the calibration of the difficulty level occurs within the level while the player is playing the game. As the player continues to play the game, the real-time in-game data is transmitted to the game modification system 120b, and more specifically transmitted directly to the database or directly the data module 330.

In yet further example embodiments, the detection module 340 is configured to determine a current difficulty level based on a player score. The player score is determined by identifying that the player is not meeting or succeeding targeted game obstacles based on an obstacle threshold value (e.g., the current level is too hard for the player resulting in a low player score). Such a determination can also be referred to a low-skilled player. A low-skilled player refers to the current gameplay difficulty being too difficult for the player, such that the player's weakness is far below the level of difficulty required of the gameplay. Alternatively, the detection module 340 can determine that the player is meeting or succeeding targeted game obstacles above a threshold value and therefore resulting in a high player score (e.g., the current level is too easy for the player). Such a determination can also be referred to a highly-skilled player. A highly-skilled player refers to the current gameplay difficulty being too easy for the player, such that the player's strength exceeds the gameplay difficulty level. Where the player is failing too many obstacles in the game, the current level is determined to be "too difficult" for the specific player. When the current game-play level is too difficult, the player often becomes more frustrated and less engaged and enthusiastic with the game. Thus, in response to the determination that the current in-level game (the level of the game that the player is currently playing) is "too difficult" for the specific player, the tuning module 350 adjusts the game obstacle for the player in order for the level to be "just hard enough." The adjustment by the tuning module 350 is further discussed in detail below.

In further example embodiments, the tuning module 350 determines the corrected level difficulty appropriate for a target player in order to fine tune the game play experience for the player by making the level "just hard enough" for that specific player's ability and skill. The difficulty level is calibrated based on historical and current data obtained from the data module 330 of the player. The detection module 340 can directly access the historical and current data or receives the historical data from the data module 330. In an example embodiment, the calibration of the difficulty level occurs within the level while the player is playing the game. As the player continues to play the game, the real-time in-game data is transmitted to the game modification system 120b, and more specifically transmitted directly to the database or directly the data module 330. Using the historical data and the real-time in-game data, the game modification system 120b becomes more accurate at gauging and calibrating the appropriate difficulty level for the specific player by learning how the player plays the game over time. Learning how the player plays includes, for example, learning the pattern of how a player reacts to certain categories of obstacles, how quickly the player adjusts to newly introduced obstacles, the types and the kind of words the players are more familiar with, and other like patterns of player behavior in a typical game play. The patterns and behavior of how a player plays a game determines the playing style of the player.

In further example embodiments, the tuning module 350 determines the corrected difficulty level in order to adjust the game based on a player score, where the player score is determined by the number of times a player passes or fails a level or an obstacle path. In a specific game example, the player score also determines the tile bag composition. The difficulty level sets an initial point for the game modification system 120b to determine how a player would pass the level. Accordingly, based on knowing how a player would potentially pass the level, the game modification system 120b determines which obstacle available for the specific game would be chosen for the game-play in accordance with the difficulty level. In a specific game example, the difficulty level determines the letter composition of a tile bag and affects the type and frequency of bonus tiles that are created for the specific player. Where the player is determined to have a pattern of behavior that utilizes bonus tiles with high frequency, the game modification 120b, via the tuning module 350, in response to detecting such behaviors, handicaps the bonus tile option entirely or augment the board structure and geometry in order for bonus tiles to be formed with more difficulty. In an example, when adjusting the difficulty level, the tuning module 350 alters the board structure and geometry via strategically placing hazards or obstacles in the game to make the game harder or easier according to the specific player's playing style. When the level is determined to be "too easy" for the player, the hazards that are chosen, then placed on the board structure would be harder than average to clear. Alternatively, the system can alter the hazards such that they can only be cleared every other turn. Further, the number of moves allowed in a game or the bonus letter length can be increased or decreased to fine tune the difficulty level. Moreover, tile drop rate is also adjusted in response to a player's pattern of word usage. Such adjustments are options utilized by the game modification system 120b to make the game "just hard enough" for the player.

In various example embodiments, the tuning module 350 adjusts and modifies the game play based on the determined player's playing style. Using the information from the data module 330 and the detection module 340, the tuning module 350 determines the specific design of the game in order to make the game play "just hard enough" for the player. The specific design includes board structure and geometry. In an example, the tuning module determines the specific design of the game by identifying where certain types of tiles should be placed or where certain types of game hazards should be placed in light of the playing style of the player as determined by analyzing the player-based data by the data module 330. In this example, if the game level is too easy for the player, the tile board geometry can be modified such that tiles for words the player is not likely to play are included in an optimal path to progressing the level, thereby making the game more challenging for the highly-skilled player. In other words, based on the player historical data, the system determines a set of words that the highly-skilled player has struggled with (and therefore not likely to play) and adjust the board geometry accordingly to make the game more challenging. In another specific example, if the game level is too easy for the player, the tile board strategy may be modified such that game hazards make it more difficult for the player to find the types of words the player has typically used in prior levels. In another example, the tuning module 350 determines that if the game level is too easy for the player because the player frequently plays words with more vowels than consonants and in response, would adjust that specific pattern to words in the game to contain more consonants than vowels since the game level of difficulty is too easy for the player. The determination of how the player plays may include parameters such as vowels in a word, length of the word, suffixes, prefixes, double consonants, and the like.

In further example embodiments, the tuning module 350 adjusts the difficulty level to match the player skill and player's playing style based on predicting the characteristics of the game play in which the player struggles with. Accordingly, the tuning module 350 predicts the appropriate difficulty level and adjusts the tile board geometry and structure to match the difficulty level of the game to that of the player's playing style for optimal game play. The profile of the gameplay level is matched with the profile of the player. The prediction is based on player-based information from the data module 330 and the difficulty level determined by the detection module 340. The longer the player plays, the more data can be accumulated and thus the better the tuning module 250 can more accurately predict the way in which the player would play the game. As a result, the tuning module 350 can dynamically modify the adjustments using adaptive learning to match the difficulty level of the game to the specific user with a certain degree of certainty. In an example, the data module 330 has determined that a highly skilled-player has a pattern of behavior of rarely choosing words containing the letter B in a hangman game. Therefore, in response to such an identified pattern, the tuning module 350 predicts the types of words that the specific player would not likely use, containing the letter B, and introduce it into the current game to make the game more challenging for that specific player. Another way for the tuning module 350 to make a game more difficult is to determine the degree of optimization that a player utilizes in obtaining a game objective. For example, the tuning module 350 can predict that the player, although highly skilled, more frequently (above a threshold) opt for a longer path to reach the objective of the game. In response, the tuning module 350 can change the game obstacle to force the highly-skilled player to take the shorter path to make the game more challenging. The prediction algorithm also takes into account information for the population average that plays the game as a whole.

In yet further example embodiments, the tuning module 350 further utilize the information gathered from all players in the game in addition to the player's behavior when predicting the appropriate difficulty level to adjustment to the make the game "just hard enough" for the player. The tuning module 350 accesses the information of the population average from the data module 330. In an example, based on the information from all players, the data module 330 determines that the population average usually plays words with an average word length of four to five letters. Further, within a population, the average player (mean, medium, or mode of any category of population certain age group, certain location, certain playing style, and the like) may use words of within a specific category, such as word with Latin roots or Germanic roots.

Figure 4:
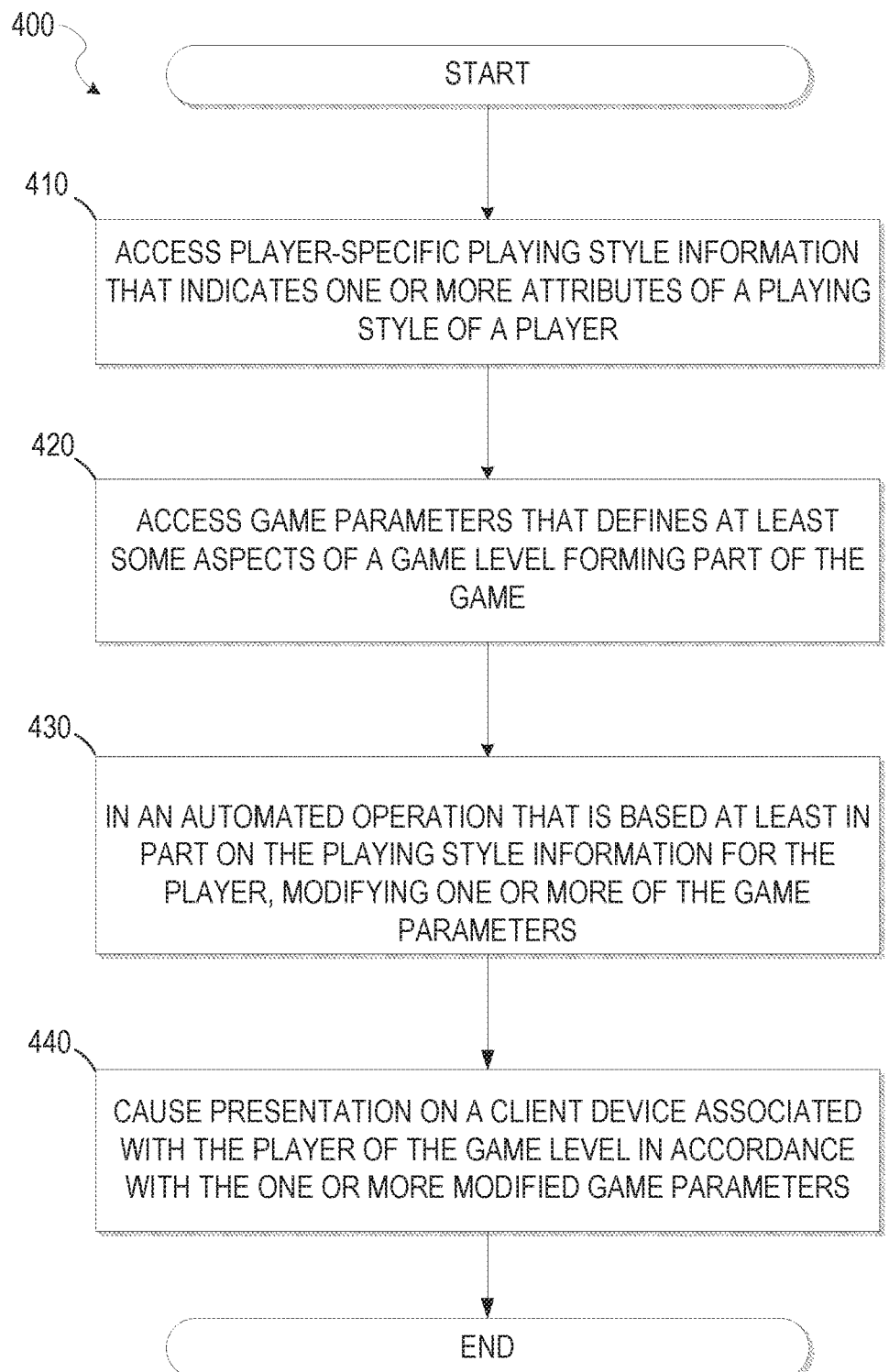
FIG. 4 is a flow diagram illustrating an example method for game modification for a specific player based on the player's playing style, according to some example embodiments.

FIG. 4 is a flow diagram that illustrates an example method 400 for determining a difficulty level for a player of the game in order to modify the game difficulty according the player's playing style. In an example embodiment, the game modification system 120b detects that the current level is too difficult for the player or too hard based on the player score and adjusts the current difficulty level accordingly. The adjustment can be in real time while the player is playing or and the end of the level when the player is progressing to another level. The adjustment is made based on predicting the likelihood that a player would make a certain type of move when confronted with a current obstacle in the game. The prediction is based on the pattern of behavior that the player has exhibited over the course of the game. The operations of method 400 can be performed by components and modules of the game modification system 120b, and are so described below for the purpose of illustration. Further, the operations are further described above in connection to each module of the game modification system 120b.

At operation 410, the detection module 340 accesses player-specific playing style information that indicates one or more attributes of a playing style of a player of a computer-implemented game, the playing style information being based on gameplay behavior of the player. Further, the detection module 340 can detect real-time interactions by a player with virtual objects in a game event from a client device. At operation 420, the data module 330 accesses game parameters that defines at least some aspects of a game level forming part of the game. Some aspects of a game include, but not limited to, a portion of a game, a specific quest included in the game, a live portion of a game the player is currently playing, a game level, a game challenge, a competition, any unit of game play, and the like. For example, a portion of a game includes a castle a player is current exploring, a specific enemy the player is in combat against, a timed event where a player must reach a certain destination, or the like.

In some embodiments, the data module 330 determines a player's playing style based on determining a plurality of pattern of behaviors in which the player plays the game using the real-time interactions and historical player-based data. For example, the data module 330 determines that the player is the type that utilizes words with more vowels than consonants with higher frequency. Another pattern of behavior that can be detected is the player picks words that are four to five letters long with a high frequency. The data module 330 can determine many patterns that the player engages in, which makes up the player's playing style. The determination of patterns of behavior utilizes current real time data from the real time interactions by the player along with historical data of the player and data from the game population (other players in the game). The data module 330 accesses the historical player-based data and the game population from a database.

In another embodiment, the detection module 340 determines a player score based on the frequency in which the player succeeds a level or an obstacle in a game. The player score is compared to a threshold value to determine whether the current difficulty level is "just hard enough" for the player. Where the current difficulty level is determined to be too easy (based on the player score falling in the low range of scores) or too hard (based on the player score falling in the high range of score), then the tuning module 350 would adjust the difficulty level so the player score will fall within the optimal range where the current difficulty level would be "just hard enough."

At operation 430, the tuning module 350 in an automated operation that is based at least in part on the playing style information for the player, modifying one or more of the game parameters, thereby to modify a difficulty of the game level for the player based on the one or more playing style attributes. The playing style attributes and game parameters are different from one game to another. In some games, as discussed, such as word-type game, the playing style attributes include the types of words used, the tiles drops, the tendency to use words with more consonants or vowels, and the like. In other games, such as a first person shooter-type game, the playing style attributes can include the response time, the range of accuracy, the patterns in which players to respond to sudden movements, and the like. In combat-type games, the playing style attributes can include whether the player struggles with a skill such as a range weapon, combating against air forces, ground forces, the player has a defensive or offensive type style, and the like. In some embodiments, there is a one to one correspondence of playing style attribute and the game parameters that correspond to them. In other embodiments, a single playing style attribute may lead to two or more game parameters (e.g., not a one to one correspondence of playing style attribute and the game parameters that corresponds to them).

In some embodiments, the tuning module 350 predicts a corrected difficulty level which matches the player's playing style, in response to the player score transgressing the threshold value. Based on the player's playing style (patterns of behavior in game play) and the population average of how well other players play the current level of the game, the tuning module 350 determine what the correct difficulty level should be so that the player score would fall in the optimal range and thereby making the game "just hard enough." For instance, if the player score is determined to be too high, the difficulty level is too easy for the player, and therefore the tuning module will predict that since the player has shown a pattern of using words that are four to five letters long, requiring words that are more than five letters or less than four letters would increase the difficulty of the level and challenge the player, thus keeping the player engaged. The tuning module 350 adjust the game to the corrected difficulty level based on the prediction.

At operation 460, the presentation module 310 causes presentation on a client device associated with the player of the game level in accordance with the one or more modified game parameters. Any adjustments that the tuning module 350 predicts the correct difficulty level should be would be presented to the player in real time as the player is playing the game.

Figure 5:
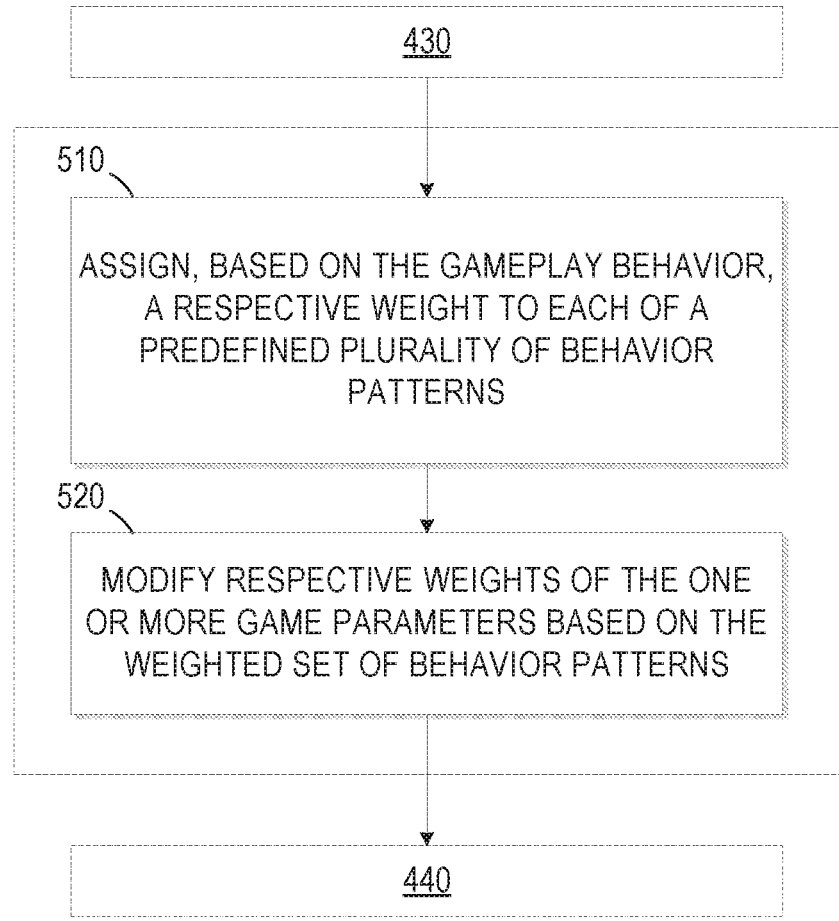
FIG. 5 is a flow diagram illustrating an example method for assigning a weight to each of a plurality of pattern of behaviors associated with the player's playing style, according to some example embodiments.

FIG. 5 is a flow diagram that illustrates further example methods 510 and 520 assigning a weight to each of the inputs into the game modification system 120b. At operation 510, the determining of the one or more playing style attributes of the player comprises assigning, based on the gameplay behavior, a respective weight to each of a predefined plurality of behavior patterns, thereby to generate a weighted set of behavior patterns. The data module 330 assigns a weight to each of the plurality of pattern of behaviors, a heavier weight is assigned to a first behavior pattern that the player engages in more often than a second behavior pattern. In some embodiments, the behavior patterns include the types of words the player uses (in a word-type game, such as words with Latin roots, use of words with more vowels or consonants, and the like). In some embodiments, the behavior pattern is a predefined set where the behavior pattern is defined by an operator with a machine to analyze and assign a weight to each of the behavior pattern. In other embodiments, the behavior pattern is not a predefined set, such that the data module 330 access game play information to determine and seek a behavior pattern that is not yet defined. The behavior patterns collectively make up the player playing style. In an example example, a specific player is determined to frequently play words that are four to five letters long, frequently plays bonus tiles, and plays words that have more vowels than consonants. Between these plurality of pattern of behaviors, the data module 330 determines that the player plays words that have more vowels than consonants more often than the other behaviors and therefore is given priority and thus is assigned the heaviest weight out of the three patterns. The other two patterns are assigned a weight less than the weight of the vowel preference. At operation 520, the tuning module 350 modifies respective weights of the one or more game parameters based on the weighted set of behavior patterns. In other embodiments, the data module 330 monitors current performance by the player in the game, compares the current performance of the player with a predefined performance target. The tuning module 350, in response to determining a discrepancy between the current performance and the performance target, performs the modifying of the one or more game parameters. The performance target can include target range, wherein if the player falls out of the target range, the tuning module 350 modifies the one or more game parameters in order to bring the player back within the target range. The target range can include an average, medium, or mode of the game population of players, within a specific age group, current location, playing style, or the like. The operations are further described above in connection to each module of the game modification system 120b.

Data Flow

Figure 6:
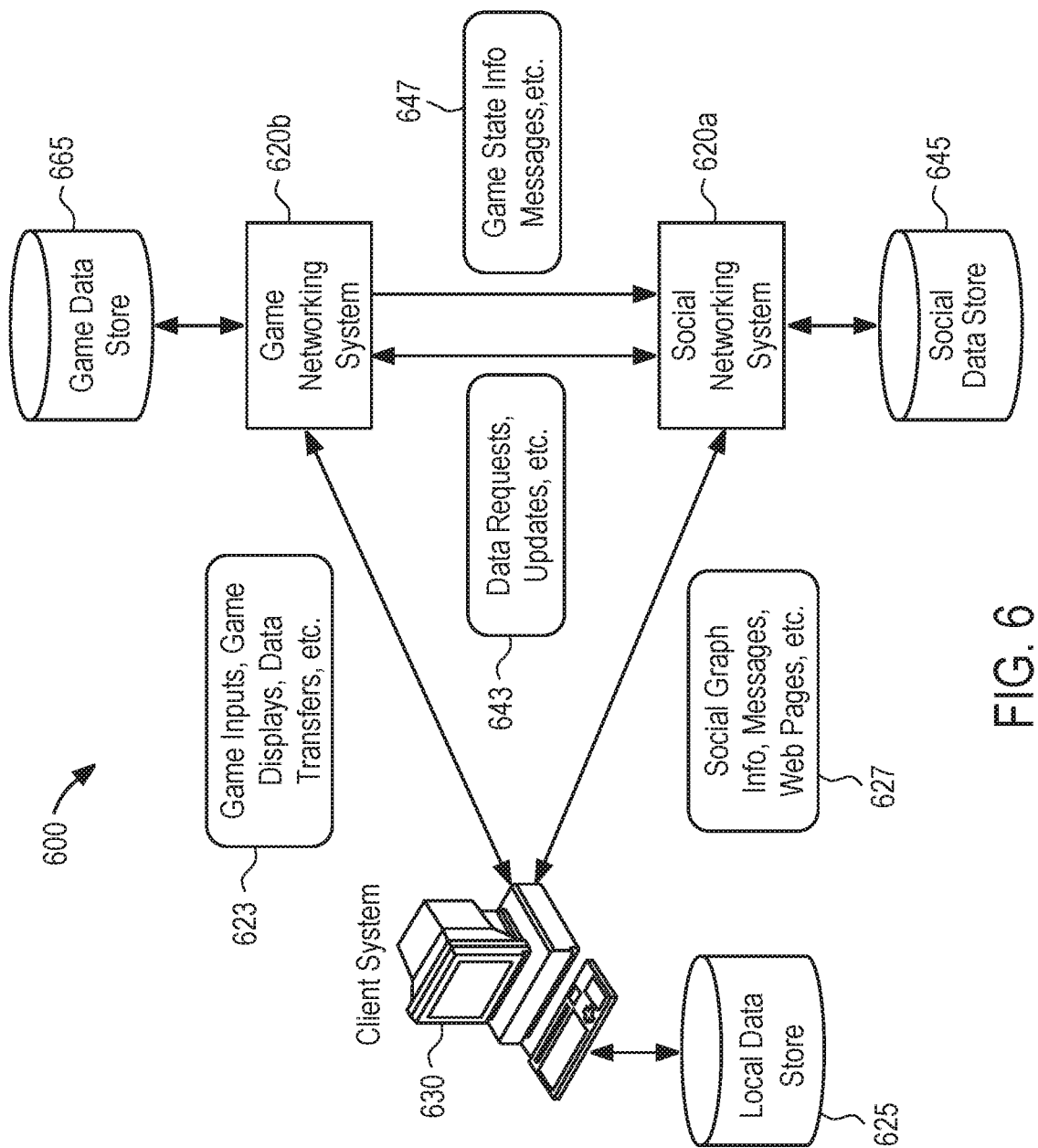
FIG. 6 is a diagrammatic representation of an example data flow between example components of the example system of FIG. 1, according to some example embodiments.

FIG. 6 illustrates an example data flow between the components of system 600. In particular embodiments, system 600 can include client system 630, social networking system 620a, and game networking system 620b, the game networking system 620b consisting of the game modification system 120b. The components of system 600 can be connected to each other in any suitable configuration, using any suitable type of connection. The components may be connected directly or over any suitable network. Client system 630, social networking system 620a, and game networking system 620b can each have one or more corresponding data stores such as local data store 625, social data store 645, and game data store 665, respectively. The local data store 625 and game data store 665 contains player based information that the game modification system 120b uses to determine the difficulty level for the specific player. Social networking system 620a and game networking system 620b can also have one or more servers that can communicate with client system 630 over an appropriate network. Social networking system 620a and game networking system 620b can have, for example, one or more internet servers for communicating with client system 630 via the Internet. Similarly, social networking system 620a and game networking system 620b can have one or more mobile servers for communicating with client system 630 via a mobile network (e.g., GSM, PCS, WPAN, etc.). In some embodiments, one server may be able to communicate with client system 630 over both the Internet and a mobile network. In other embodiments, separate servers can be used.

Client system 630 can receive and transmit data 623 to and from game networking system 620*b*. This data can include, for example, webpages, messages, game inputs, game displays, HTTP packets, data requests, transaction information, updates, and other suitable data. At some other time, or at the same time, game networking system 620*b* can communicate data 643, 647 (e.g., game state information, game system account information, page info, messages, data requests, updates, etc. with other networking systems, such as social networking system 620*a* (e.g., Facebook, Myspace, etc.). Client system 630 can also receive and transmit data 627 to and from social networking system 620*a*. This data can include, for example, webpages, messages, social graph information, social network displays, HTTP packets, data requests, transaction information, updates, and other suitable data.

Communication between client system 630, social networking system 620*a*, and game networking system 620*b* can occur over any appropriate electronic communication medium or network using any suitable communications protocols. For example, client system 630, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, ITP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 620*b*, the BLOB containing the game state for the instance corresponding to the player can be transmitted to client system 630 for use by a client-side executed object to process. In particular embodiments, the client-side executable may be a FLASH-based game, which can de-serialize the game state data in the BLOB. As a player plays the game, the game logic implemented at client system 630 maintains and modifies the various game state parameters locally. The client-side game logic may also batch game events, such as mouse clicks, and transmit these events to game networking system 620*b*. Game networking system 620*b* may itself operate by retrieving a copy of the BLOB from a database or an intermediate memory cache (memcache) layer. Game networking system 620*b* can also de-serialize the BLOB to resolve the game state parameters and execute its own game logic based on the events in the batch file of events transmitted by the client to synchronize the game state on the server side. Game networking system 620*b* may then re-serialize the game state, now modified, into a BLOB and pass this to a memory cache layer for lazy updates to a persistent database.

With a client-server environment in which the online games may run, one server system, such as game networking system 620*b*, may support multiple client systems 630. At any given time, there may be multiple players at multiple client systems 630 all playing the same online game. In practice, the number of players playing the same game at the same time may be very large. As the game progresses with each player, multiple players may provide different inputs to the online game at their respective client systems 630, and multiple client systems 630 may transmit multiple player inputs and/or game events to game networking system 620*b* for further processing. In addition, multiple client systems 630 may transmit other types of application data to game networking system 620*b*.

In particular embodiments, a computed-implemented game may be a text-based or turn-based game implemented as a series of web pages that are generated after a player selects one or more actions to perform. The web pages may be displayed in a browser client executed on client system 630. As an example and not by way of limitation, a client application downloaded to client system 630 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 620*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 630, either caused by an action of a game player or by the game logic itself, client system 630 may need to inform game networking system 620*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 600 is discussed in reference to updating a multi-player online game hosted on a network-addressable system (such as, for example, social networking system 620a or game networking system 620b), where an instance of the online game is executed remotely on a client system 630, which then transmits application event data to the hosting system such that the remote game server synchronizes game state associated with the instance executed by the client system 630.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 630 may include a Flash client. The Flash client may be configured to receive and run Flash application or game object code from any suitable networking system (such as, for example, social networking system 620a or game networking system 620b). In particular embodiments, the Flash client may be run in a browser client executed on client system 630. A player can interact with Flash objects using client system 630 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 630, the Flash client may send the events that caused the game state changes to the in-game object to game networking system 620b. However, to expedite the processing and hence the speed of the overall gaming experience, the Flash client may collect a batch of some number of events or updates into a batch file. The number of events or updates may be determined by the Flash client dynamically or determined by game networking system 620b based on server loads or other factors. For example, client system 630 may send a batch file to game networking system 620b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 630.

In particular embodiments, the batch file may be a text file and the name-value pairs may be in string format.

In particular embodiments, when a player plays an online game on client system 630, game networking system 620b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 620b may retrieve the corresponding BLOB from the database to determine the most-recent values of the game-related data. In particular embodiments, while a player is playing the online game, game networking system 620b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 7:
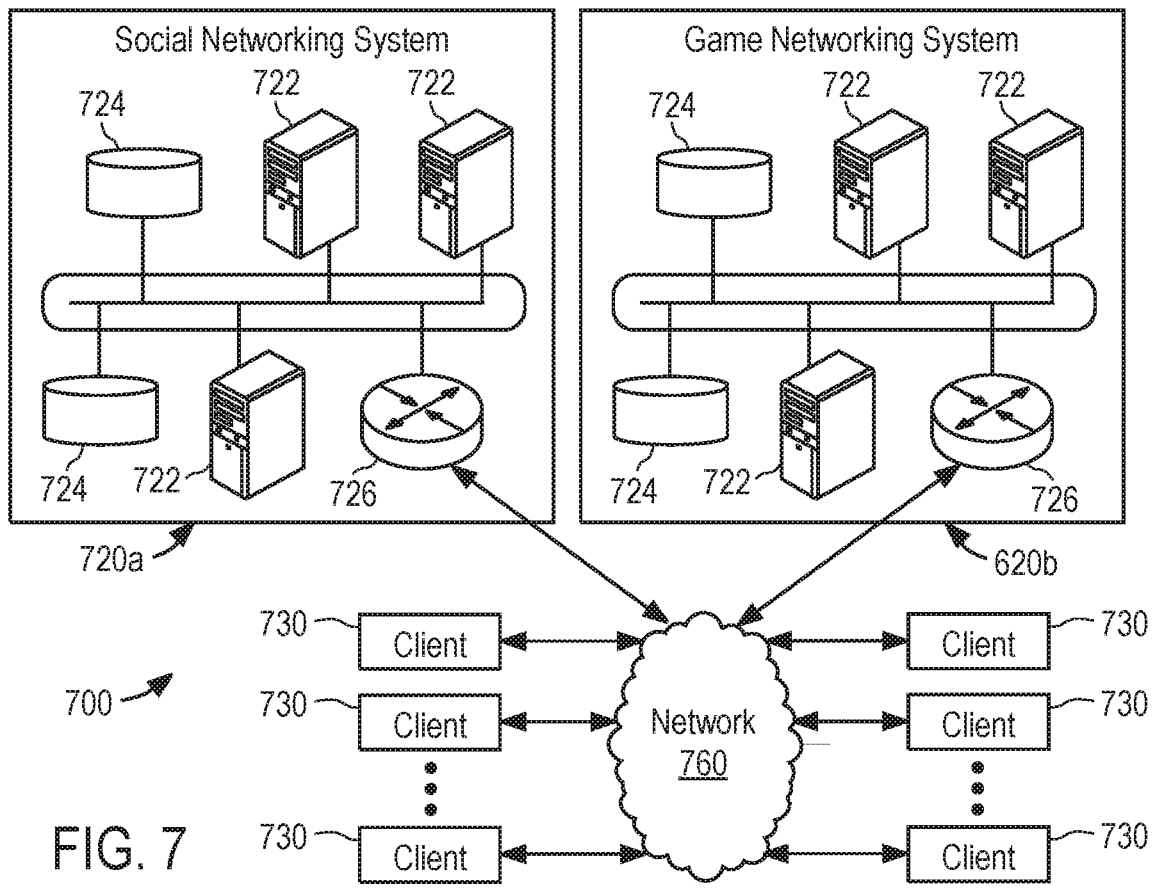
FIGS. 7-8 are schematic diagrams showing an example network environment, in which various example embodiments may operate, according to some example embodiments.
Figure 8:
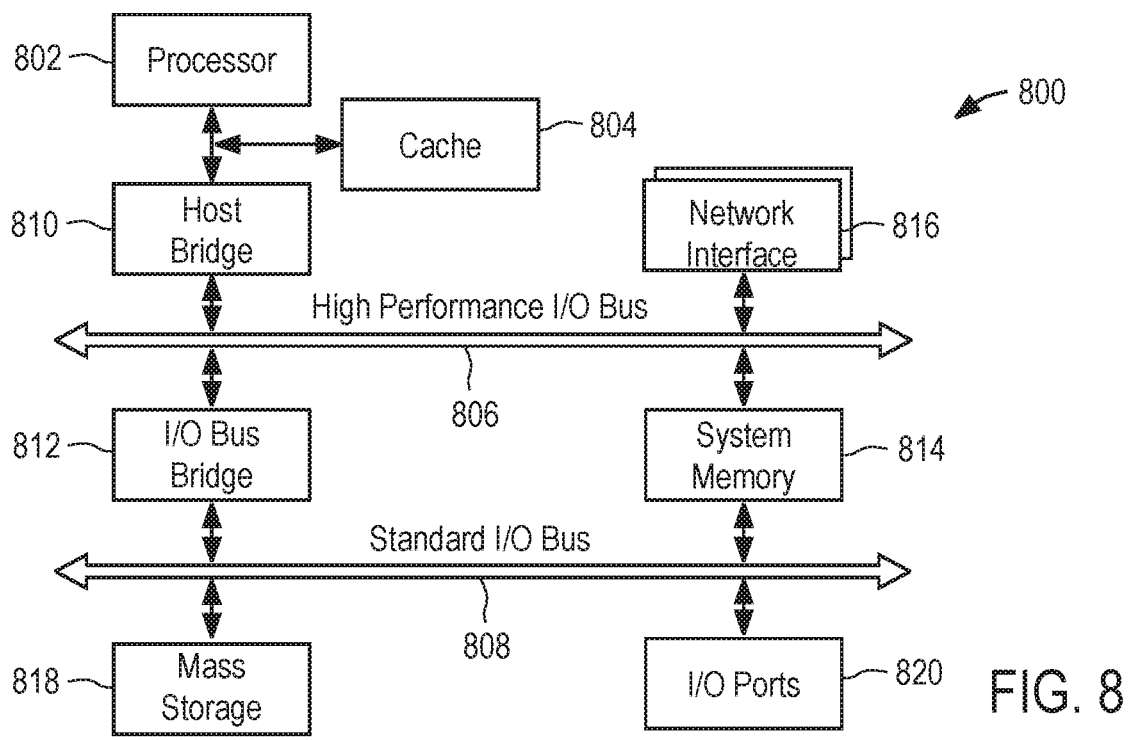

Particular embodiments may operate in a wide area network environment, such as the Internet, including multiple network addressable systems. FIG. 7 illustrates an example network environment, in which various example embodiments may operate. Network cloud 760 generally represents one or more interconnected networks, over which the systems and hosts described herein can communicate. Network cloud 760 may include packet-based wide area networks (such as the Internet), private networks, wireless networks, satellite networks, cellular networks, paging networks, and the like. As FIG. 7 illustrates, particular embodiments may operate in a network environment comprising one or more networking systems, such as social networking system 720a, game networking system 720b, and one or more client systems 730. The components of social networking system 720a and game networking system 720b operate analogously; as such, hereinafter they may be referred to simply at networking system 720. Client systems 730 are operably connected to the network environment via a network service provider, a wireless carrier, or any other suitable means.

Networking system 720 is a network addressable system that, in various example embodiments, comprises one or more physical servers 722 and data stores 724. The one or more physical servers 722 are operably connected to computer network 760 via, by way of example, a set of routers and/or networking switches 726. In an example embodiment, the functionality hosted by the one or more physical servers 722 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 722 may host functionality directed to the operations of networking system 720. Hereinafter servers 722 may be referred to as server 722, although server 722 may include numerous servers hosting, for example, networking system 720, as well as other content distribution servers, data stores, and databases. Data store 724 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 724 corresponds to one or more of a variety of separate and integrated databases, such as relational databases and object-oriented databases, that maintain information as an integrated collection of logically related records or files stored on one or more physical systems. Structurally, data store 724 may generally include one or more of a large class of data storage and management systems. In particular embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as target structured document) hosted by networking system 720, the user's web browser, or other document rendering engine or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 7 described with respect to social networking system 720*a* and game networking system 720*b*, this disclosure encompasses any suitable network environment using any suitable systems. As an example and not by way of limitation, the network environment may include online media systems, online reviewing systems, online search engines, online advertising systems, or any combination of two or more such systems.

FIG. 11 illustrates an example computing system architecture, which may be used to implement a server 722 or a client system 730. In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 808. A host bridge 810 may couple processor 802 to high performance I/O bus 806, whereas I/O bus bridge 812 couples the two buses 806 and 808 to each other. A system memory 814 and one or more network/communication interfaces 816 may couple to bus 806. Hardware system 800 may further include video memory (not shown) and a display device coupled to the video memory. Mass storage 818 and I/O ports 820 may couple to bus 808. Hardware system 800 may optionally include a keyboard, a pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in servers 422, whereas system memory 814 (e.g., DRAM) provides temporary'storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present disclosure may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the methods and systems can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
  accessing playing style information that defines a player-specific playing style of a player of a computer-implemented game in which gameplay comprises word-forming actions, the playing style information being based on historic gameplay behavior of the player and being indicative of one or more word types favored by the player;
  in an automated operation that is based at least in part on the playing style information and that is performed using one or more computer processor devices configured therefor, modifying one or more game parameters for a game instance specific to the player, thereby to provide a player-specific customized difficulty of the game instance for the player based on the respective defined playing style; and
  causing presentation on a client device associated with the player of the game instance in accordance with the one or more modified game parameters.

2. The method of claim 1, further comprising determining the playing style of the player by performing automated analysis of the historic gameplay behavior of the player.

3. The method of claim 1, wherein:
  the one or more game parameters are respective game level parameters specific to a particular game level; and
  wherein the historic gameplay behavior includes gameplay actions performed by the player during playing of the particular game level.

4. The method of claim 1, wherein the modifying of the one or more game parameters effects a change in a board structure of a gameboard on which words are to be formed during gameplay.

5. The method of claim 1, wherein the modifying of the one or more game parameters effects a change in board geometry of a gameboard on which words are to be formed during gameplay.

6. The method of claim 1, wherein the one or more word types indicated by the playing style information includes words having vowels as a majority of letters.

7. The method of claim 1, wherein the one or more word types indicated by the playing style information includes words with particular suffixes favored by the player.

8. The method of claim 1, wherein the one or more word types indicated by the playing style information includes words with particular prefixes favored by the player.

9. The method of claim 1, wherein the one or more word types indicated by the playing style information includes words without a particular letter disfavored by the player.

10. A system comprising:
a one or more computer processor devices; and
a memory storing instructions that, when executed by the one or more computer processor devices, configure the system to perform operations comprising:
accessing playing style information that defines a player-specific playing style of a player of a computer-implemented game in which gameplay comprises word-forming actions, the playing style information being based on historic gameplay behavior of the player and being indicative of one or more word types favored by the player;
modifying one or more game parameters for a game instance specific to the player, thereby to provide a player-specific customized difficulty of the game instance for the player based on the respective defined playing style; and
causing presentation on a client device associated with the player of the game instance in accordance with the one or more modified game parameters.

11. The system of claim 10, wherein the instructions further configure the system to determine the playing style of the player by performing automated analysis of the historic gameplay behavior of the player.

12. The system of claim 11, wherein the instructions configure the system to determine the playing style of the player by assigning, based on the historic gameplay behavior, a respective weight to each of a plurality of behavior patterns defining respective word types employed during gameplay, thereby to generate a weighted set of behavior patterns that together define the playing style of the player.

13. The system of claim 12, wherein the one or more game parameters correspond to the plurality of behavior patterns, the modify of the one or more game parameters comprising modifying respective weights of the one or more game parameters based on the weighted set of behavior patterns.

14. The system of claim 10, wherein:
the one or more game parameters are respective game level parameters specific to a particular game level; and
wherein the historic gameplay behavior is provided by gameplay actions performed by the player prior to starting gameplay in the particular game level.

15. The system of claim 10, wherein:
the one or more game parameters are respective game level parameters specific to a particular game level; and
wherein the historic gameplay behavior includes gameplay actions performed by the player during playing of the particular game level.

16. The system of claim 10, wherein the instructions further configure the system to:
monitor current performance by the player in the game;
compare the current performance of the player with a predefined performance target; and
in response to determining a discrepancy between the current performance and the performance target, perform the modifying of the one or more game parameters.

17. The system of claim 10, wherein the modifying of the one or more game parameters effects a change in a board structure of a gameboard on which words are to be formed during gameplay.

18. The system of claim 10, wherein the modifying of the one or more game parameters effects a change in board geometry of a gameboard on which words are to be formed during gameplay.

19. A non-transitory computer-readable storage medium, the computer-readable storage medium including instructions that when executed by a computer, cause the computer to perform operations comprising:
accessing playing style information that defines a player-specific playing style of a player of a computer-implemented game in which gameplay comprises word-forming actions, the playing style information being based on historic gameplay behavior of the player and being indicative of one or more word types favored by the player;
modifying one or more game parameters for a game instance specific to the player, thereby to provide a player-specific customized difficulty of the game instance for the player based on the respective defined playing style; and
causing presentation on a client device associated with the player of the game instance in accordance with the one or more modified game parameters.

* * * * *

UNITED STATES PATENT AND TRADEMARK OFFICE
CERTIFICATE OF CORRECTION

PATENT NO. : 11,148,057 B2
APPLICATION NO. : 16/738474
DATED : October 19, 2021
INVENTOR(S) : Ntoulas et al.

It is certified that error appears in the above-identified patent and that said Letters Patent is hereby corrected as shown below:

On the Title Page

On page 4, in Column 2, under "Other Publications", Line 69, delete "Actio" and insert --Action-- therefor On page 5, in Column 2, under "Other Publications", Line 32, delete "Attribuies" and insert --Attributes-- therefor On page 5, in Column 2, under "Other Publications", Line 73, delete "Parater" and insert --Parameter-- therefor In the Drawings Sheet 7 of 7, Fig. 7, reference numeral 620b, delete "620b" and insert --720b-- therefor In the Specification In Column 2, Line 23, delete "strongly." and insert --strongly-- therefor In Column 3, Line 26, delete "sonic" and insert --some-- therefor In Column 5, Line 5, delete "1120b" and insert --120b-- therefor In Column 9, Line 37, delete "system," and insert --system.-- therefor In Column 9, Line 40, delete "a." and insert --a-- therefor In Column 9, Line 46, delete "Friend Friend" and insert --Friend-- therefor In Column 10, Line 64, delete "gaining" and insert --gaming-- therefor Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,148,057 B2

In Column 11, Line 2, delete "10" and insert --310-- therefor

In Column 11, Line 45, after "game)", insert --.--

In Column 15, Line 32, delete "250" and insert --350-- therefor

In Column 17, Line 46, delete "460," and insert --440,-- therefor

In Column 18, Line 64, after "PCS,", insert --Wi-Fi,--

In Column 19, Line 3, delete "fur" and insert --for-- therefor

In Column 19, Line 9, after "etc.", insert --)--

In Column 19, Line 31, delete "ITP," and insert --FTP,-- therefor

In Column 25, Line 4, delete "422," and insert --722,-- therefor

In Column 25, Line 5, delete "temporary'storage" and insert --temporary storage-- therefor